United States Patent
Yeo et al.

(10) Patent No.: US 12,041,556 B2
(45) Date of Patent: Jul. 16, 2024

(54) METHOD AND DEVICE FOR CONTROLLING POWER IN WIRELESS COMMUNICATION SYSTEM

(71) Applicant: Samsung Electronics Co., Ltd., Gyeonggi-do (KR)

(72) Inventors: Jeongho Yeo, Gyeonggi-do (KR); Hyunseok Ryu, Gyeonggi-do (KR); Jinyoung Oh, Gyeonggi-do (KR); Seunghoon Choi, Gyeonggi-do (KR); Jonghyun Bang, Gyeonggi-do (KR); Cheolkyu Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 381 days.

(21) Appl. No.: 17/419,547

(22) PCT Filed: Jan. 9, 2020

(86) PCT No.: PCT/KR2020/000429
§ 371 (c)(1),
(2) Date: Jun. 29, 2021

(87) PCT Pub. No.: WO2020/145703
PCT Pub. Date: Jul. 16, 2020

(65) Prior Publication Data
US 2022/0086768 A1   Mar. 17, 2022

(30) Foreign Application Priority Data

Jan. 10, 2019   (KR) .................. 10-2019-0003497

(51) Int. Cl.
*H04W 52/24*    (2009.01)
*H04W 52/38*    (2009.01)

(52) U.S. Cl.
CPC ....... *H04W 52/242* (2013.01); *H04W 52/383* (2013.01)

(58) Field of Classification Search
CPC . H04W 52/242; H04W 52/383; H04W 52/38; H04W 52/365; H04W 92/18
See application file for complete search history.

(56) References Cited

U.S. PATENT DOCUMENTS 9,642,099 B2    5/2017  Baheri et al.
9,807,710 B2 *  10/2017 Seo .................. H04W 4/70
(Continued)

FOREIGN PATENT DOCUMENTS

KR    10-2017-0056506    5/2017
KR    2020-0036726       4/2020
(Continued)

OTHER PUBLICATIONS

3GPP, 3rd Generation Partnership Project; Technical Specification Group Radio Access Network; NR; Physical Layer Procedures for Control (Release 15), 3GPP TS 38.213 V15.3.0, Sep. 2018, 101 pages.

(Continued)

*Primary Examiner* — Jinsong Hu
*Assistant Examiner* — Rui M Hu
(74) *Attorney, Agent, or Firm* — The Farrell Law Firm, P.C.

(57) ABSTRACT

The present disclosure relates to: a communication technique combining a 5G communication system, for supporting a higher data transfer rate than 4G systems, with IoT technology; and a system therefor. The present disclosure can be applied to intelligent services (for example, smart homes, smart buildings, smart cities, smart cars or connected cars, healthcare, digital education, retail businesses, security and safety-related services, etc.) on the basis of 5G communication technology and IoT-related technology. According to an embodiment of the present invention, a method of a terminal side link communication is characterized by (Continued)

further comprising: determining a first path attenuation between a second terminal and a first terminal; determining a second path attenuation between a base station and the first terminal; determining the transmission power of the first terminal based on at least one among the first pathloss and the second pathloss; and transmitting a signal based on the transmission power of the first terminal.

12 Claims, 23 Drawing Sheets

(56) References Cited

U.S. PATENT DOCUMENTS

| | | | | |
|---|---|---|---|---|
| 9,961,487 | B1* | 5/2018 | Miao | H04W 4/029 |
| 10,412,692 | B2 | 9/2019 | Siomina | |
| 10,680,760 | B2* | 6/2020 | Chae | H04W 72/02 |
| 10,880,719 | B2* | 12/2020 | Poitau | H04W 76/14 |
| 11,452,136 | B2* | 9/2022 | Liu | H04W 48/10 |
| 11,516,688 | B2* | 11/2022 | Takahashi | H04L 5/0048 |
| 11,595,112 | B2* | 2/2023 | Kusashima | H04B 7/18506 |
| 2013/0272233 | A1* | 10/2013 | Dinan | H04L 5/001 |
| | | | | 370/329 |
| 2013/0310103 | A1* | 11/2013 | Madan | H04W 52/242 |
| | | | | 455/522 |
| 2014/0198694 | A1* | 7/2014 | Yang | H04W 72/0446 |
| | | | | 370/311 |
| 2014/0233476 | A1* | 8/2014 | Kwak | H04W 52/383 |
| | | | | 370/329 |
| 2016/0014834 | A1 | 1/2016 | Chang et al. | |
| 2016/0057709 | A1 | 2/2016 | Gao et al. | |
| 2016/0135143 | A1* | 5/2016 | Won | H04W 52/243 |
| | | | | 370/312 |
| 2016/0198414 | A1* | 7/2016 | Yano | H04W 52/242 |
| | | | | 455/522 |
| 2016/0286375 | A1* | 9/2016 | Fujishiro | H04W 76/27 |
| 2016/0330699 | A1* | 11/2016 | Yang | H04W 52/241 |
| 2016/0353450 | A1* | 12/2016 | Miao | H04W 4/023 |
| 2017/0041884 | A1* | 2/2017 | Kwak | H04W 52/383 |
| 2017/0055224 | A1* | 2/2017 | Boccardi | H04W 52/36 |
| 2018/0368081 | A1* | 12/2018 | Akkarakaran | H04W 52/365 |
| 2019/0044681 | A1* | 2/2019 | Zhang | H04L 5/0094 |
| 2019/0052411 | A1* | 2/2019 | Chae | H04W 52/242 |
| 2019/0165830 | A1* | 5/2019 | Bienas | H04W 72/02 |
| 2019/0173612 | A1* | 6/2019 | Kimura | H04L 1/0063 |
| 2020/0053743 | A1* | 2/2020 | Cheng | H04W 4/40 |
| 2020/0112927 | A1* | 4/2020 | Han | H04W 52/365 |
| 2020/0145929 | A1* | 5/2020 | Ryu | H04W 52/242 |
| 2020/0313801 | A1* | 10/2020 | Chae | H04W 52/365 |
| 2021/0136699 | A1* | 5/2021 | Scholand | H04W 52/242 |
| 2021/0250878 | A1* | 8/2021 | Liu | H04W 52/10 |
| 2021/0344454 | A1* | 11/2021 | Lee | H04L 1/1692 |
| 2021/0410084 | A1* | 12/2021 | Li | H04W 52/265 |
| 2022/0030523 | A1* | 1/2022 | Wang | H04W 52/26 |

FOREIGN PATENT DOCUMENTS

| | | |
|---|---|---|
| KR | 2020-0050838 | 5/2020 |
| WO | WO 2015-169222 | 11/2015 |

OTHER PUBLICATIONS

3GPP, 3rd Generation Partnership Project; Technical Specification Group Radio Access Network; NR; Physical Layer Measurements (Release 15), 3GPP TS 38.215 V15.3.0, Sep. 2018, 15 pages.
European Search Report dated Dec. 15, 2021 issued in counterpart application No. 20738144.3-1205, 10 pages.
PCT/ISA/210 Search Report issued on PCT/KR2020/000429, dated Apr. 22, 2020, 5 pages.
PCT/ISA/237 Written Opinion issued on PCT/KR2020/000629, dated Apr. 22, 2020, 4 pages.
European Search Report dated Mar. 28, 2023 issued in counterpart application No. 20738144.3-1206, 6 pages.

* cited by examiner

METHOD AND DEVICE FOR CONTROLLING POWER IN WIRELESS COMMUNICATION SYSTEM

PRIORITY

This application is a National Phase Entry of PCT International Application No. PCT/KR2020/000429 which was filed on Jan. 9, 2020, and claims priority to Korean Patent Application No. 10-2019-0003497, which was filed on Jan. 10, 2019, the content of each of which is incorporated herein by reference.

TECHNICAL FIELD

The disclosure relates to a wireless communication system, and relates to a method and apparatus for controlling transmission power and reporting a power headroom. More particularly, the disclosure relates to a method of controlling transmission power and a method of reporting a power headroom when a user equipment (UE) transmits data and control information via a sidelink for D2D, V2X communication, or the like.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications. In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

DISCLOSURE OF INVENTION

Technical Problem

The disclosure provides a method and apparatus for controlling a transmission power and reporting a power headroom. More particularly, the disclosure relates to a method of controlling a transmission power and a method of reporting a power headroom to a partner when a user equipment (UE) transmits data and control information via a sidelink for D2D, V2X communication, or the like.

It may be important for a UE in a sidelink or a base station (BS) to determine transmission power in order to manage an interference signal. In addition, it is also important to know how much power a UE is further capable of using or how large a power the UE is currently controlled to use. Therefore, the disclosure provides a method and apparatus for controlling a sidelink power and reporting a power headroom.

Solution to Problem

In order solve the problems described above, a method of a user equipment (UE) performing sidelink communication according to the disclosure includes: determining a first pathloss between the first UE and a second UE; determining a second pathloss between the first UE and a base station (BS); determining a transmission power of the first UE based on at least one of the first pathloss and the second pathloss; and transmitting a signal based on the transmission power of the first UE.

Further, in order solve the problems described above, a UE performing sidelink communication according to the disclosure includes: a transceiver; and a controller configured to: determine a first pathloss between the first UE and a second UE; determine a second pathloss between the first UE and a BS; determine a transmission power of the first UE based on at least one of the first pathloss and the second pathloss; and transmit a signal via the transceiver based on the transmission power of the first UE.

Advantageous Effects of Invention

According to an embodiment of the disclosure, the transmission power of a user equipment (UE) can be controlled and a power headroom can be reported.

MODE FOR THE INVENTION

Figure 1:
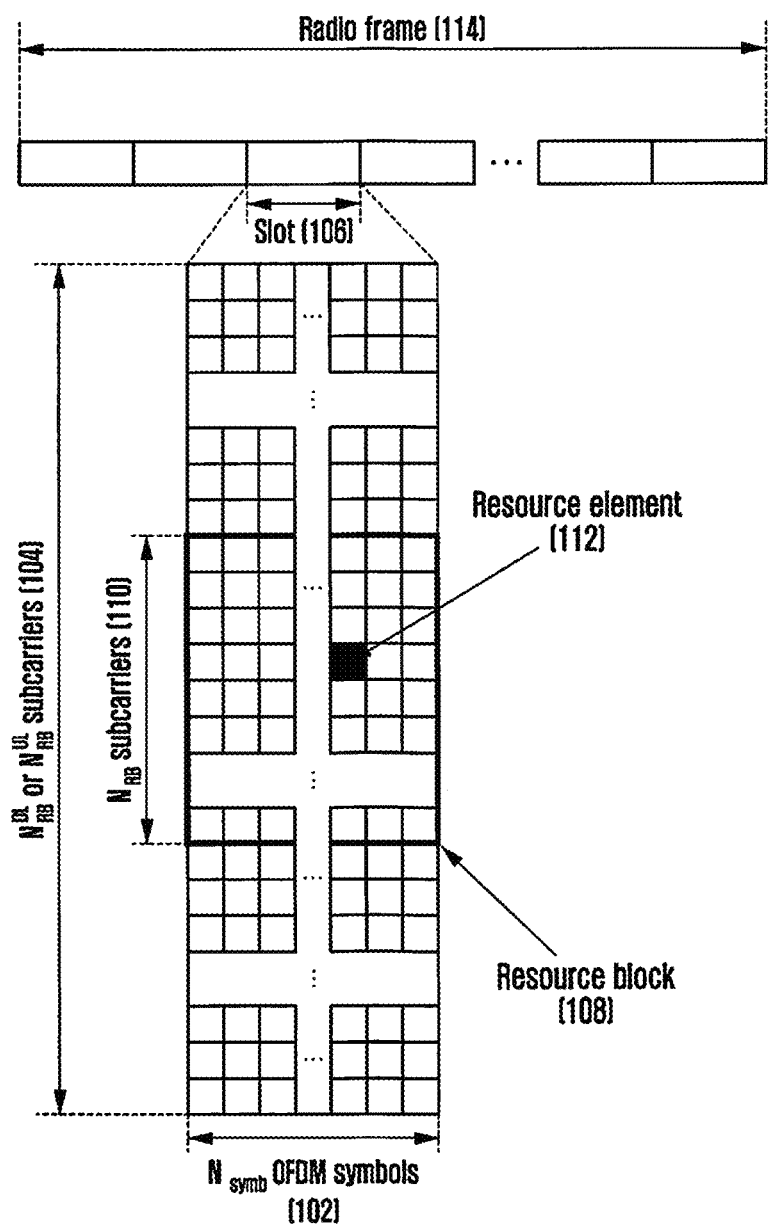
FIG. 1 is a diagram illustrating a time-frequency domain transmission architecture in a downlink or uplink of a new radio (NR) system.

The new radio (NR) access technology which is a new 5G communication technology is designed to enable various services to be freely multiplexed in time and frequency resources. Accordingly, a waveform, a numerology, a reference signal, or the like may be dynamically or freely allocated as a corresponding service is needed. In order to provide an optimal service to a user equipment (UE) in wireless communication, it is important to optimize data transmission by measuring the quality of a channel and the amount of interference. Accordingly, accurate measurement of a channel state is essential. However, unlike 4G communication in which channel and interference characteristics do not significantly change depending on a frequency resource, channel and interference characteristics significantly change according to a service in the case of a 5G channel.

Accordingly, a subset from the perspective of a frequency resource group (FRG) needs to be supported, so that the channel and interference characteristics may be measured segmentally. The types of services supported in the NR system may be categorized as enhanced mobile broadband (eMBB), massive machine type communications (mMTC), ultra-reliable and low-latency communications (URLLC), and the like.

eMBB is a service for high-speed transmission of large-capacity data. mMTC is a service for UE power minimization and multi-UE access. URLLC is a service for high reliability and low latency. Different requirements may be applied depending on the type of service applied to a UE.

As described above, a plurality of services may be provided to a user in a communication system. In order to provide a plurality of services to a user, there is a desire for a method and an apparatus for providing services according to respective characteristics within the same time interval.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has developed to be a broadband wireless communication system that provides a high-speed and high-quality packet data service, like the communication standards, for example, high speed packet access (HSPA) of 3GPP, long term evolution (LTE) or evolved universal terrestrial radio access (E-UTRA), LTE-advanced (LTE-A), high rate packet data (HRPD) of 3GPP2, ultramobile broadband (UMB), and 802.16e of IEEE, or the like, beyond the voice-based service provided at the initial stage. In addition, as a 5G wireless communication system, the communication standard of 5G or new radio (NR) is being developed.

An NR system, which is a representative example of the broadband wireless communication system, employs an orthogonal frequency division multiplexing (OFDM) scheme in a downlink (DL) and an uplink (UL). Particularly, a cyclic-prefix OFDM (CP-OFDM) scheme is employed in a downlink, and a CP-OFDM scheme and a discrete Fourier transform spreading OFDM (DFT-S-OFDM) scheme are employed in an uplink. The uplink is a radio link via which a user equipment (UE) or a mobile station (MS) transmits data or a control signal to a base station (gNodeB or a base station (BS)). The downlink is a radio link via which a BS transmits data or a control signal to a UE. The multiple access scheme described above may allocate or manage time-frequency resources via which data or control information is carried for each user, to not overlap one another, that is, to have orthogonality, and thereby distinguishing data or control information of each user.

The NR system employs a hybrid automatic repeat request (HARQ) scheme that retransmits corresponding data in a physical layer when decoding fails at the initial transmission. The HARQ scheme is a scheme that enables a receiver to transmit, to a transmitter, information (negative acknowledgement (NACK)) indicating the failure of decoding when the receiver does not accurately decode data, so that the transmitter retransmits the corresponding data in a physical layer. The receiver may combine data retransmitted from the transmitter and previous data, decoding of which fails, whereby data reception performance may increase. In addition, when the receiver accurately decodes data, the receiver transmits information (ACK) reporting that decoding is successfully executed, so that the transmitter transmits new data.

FIG. 1 is a diagram illustrating the basic structure of the time-frequency domain which is a radio resource region where data or a control channel is transmitted in a downlink or an uplink of an NR system.

Referring to FIG. 1, the horizontal axis is the time domain, and the vertical axis is the frequency domain. The minimum transport unit in the time domain is an OFDM symbol, and $N_{symb}$ OFDM symbols 102 may be included in a single slot 106. The length of a subframe is defined to be 1.0 ms, and the length of a radio frame 114 is defined to be 10 ms. The minimum transport unit in the frequency domain is a subcarrier. The entire system transmission bandwidth may include a total of $N_{BW}$ subcarriers 104.

A basic resource unit in the time-frequency domain is a resource element (RE) 112, and an RE is expressed by an OFDM symbol index and a subcarrier index. A resource block (RB) (or physical resource block (PRB)) 108 is defined by $N_{symb}$ consecutive OFDM symbols 102 in the time domain and $N_{RB}$ consecutive subcarriers 110 in the frequency domain. Therefore, one RB 108 includes $N_{symb} \times N_{RB}$ REs 112. Generally, the minimum transport unit of data is an RB. In the NR system, generally, $N_{symb}=14$ and $N_{RB}=12$. $N_{BW}$ and $N_{RB}$ are proportional to a system transmission bandwidth. The data rate may increase in proportional to the number of RBs scheduled for a UE.

In the NR system, a downlink transmission bandwidth and an uplink transmission bandwidth may be different from each other in the case of an FDD system that operates a downlink and an uplink based on a frequency. A channel bandwidth may be an RF bandwidth corresponding to a system transmission bandwidth. Table 1 and Table 2 show a part of the correspondence relationship of a system transmission bandwidth, a subcarrier spacing, and a channel bandwidth defined in the NR system, respectively in a frequency band lower than 6 GHz and a frequency band higher than 6 GHz. For example, when the NR system has a channel bandwidth of 100 MHz with an SCS of 30 kHz, the transmission bandwidth may include 273 RBs. N/A in the following table may be a bandwidth-subcarrier combination that is not supported by the NR system.

TABLE 1

| Channel bandwidth $BW_{Channel}$ [MHz] | subcarrier spacing | 5 | 10 | 20 | 50 | 80 | 100 |
|---|---|---|---|---|---|---|---|
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

| Channel bandwidth $BW_{Channel}$ [MHz] | subcarrier spacing | 50 | 100 | 20 | 50 |
|---|---|---|---|---|---|
| Transmission bandwidth configuration $N_{RB}$ | 60 kHz | 66 | 132 | 264 | N/A |
| | 120 kHz | 32 | 66 | 132 | 264 |

In the NR system, scheduling information associated with downlink data or uplink data may be transmitted from a BS to a UE via downlink control information (DCI). DCI is defined based on one of the various formats. Depending on each format, the DCI indicates whether scheduling information is scheduling information (UL grant) for uplink data or scheduling information (DL grant) for downlink data, whether the size of control information is small compact DCI, whether spatial multiplexing using multiple antennas is applied, whether DCI is for the purpose of power control, or the like. For example, DCI format 1-1 which is the scheduling control information (DL grant) for downlink data may include one of the following pieces of control information.

Carrier indicator: indicates a frequency carrier in which transmission is performed.
DCI format indicator: indicates whether a corresponding DCI is for a downlink or an uplink.
Bandwidth part (BWP) indicator: indicates a BWP in which transmission is performed.
Frequency domain resource allocation: indicates an RB allocated in the frequency domain for data transmission. An expressed resource is determined based on a system bandwidth and a resource allocation scheme.
Time domain resource allocation: indicates which OFDM symbol of which slot a data-related channel is to be transmitted.
VRB-to-PRB mapping: indicates a mapping scheme used for mapping between a virtual RB (VRB) index and a physical RB (PRB) index.
Modulation and coding scheme (MCS): indicates a modulation scheme used for data transmission and the size of a transport block which is data to be transmitted.
HARQ process number: indicates the process number of HARQ.
New data indicator: indicates whether it is HARQ initial transmission or HARQ retransmission.
Redundancy version: indicates the redundancy version of HARQ.
Transmit power control (TPC) command for physical uplink control channel (PUCCH): indicates a transmission power control command for a PUCCH which is an uplink control channel.
In the case of data transmission via a PUSCH, time domain resource assignment may be delivered via information associated with a slot in which a PUSCH is transmitted, a start symbol location S of the corresponding slot, and the number L of symbols to which the PUSCH is mapped. Herein, S is the relative location from the start of a slot. L denotes the number of consecutive symbols. S and L may be determined based on a start and length indicator value (SLIV) defined as below.

if $(L-1) \leq 7$ then $$SLIV = 14 \cdot (L-1) - S$$

else $$SLIV = 14 \cdot (14-L+1) - (14-1-S)$$

where $0 < L \leq 14-S$

In the NR system, a UE may be configured with information associated with an SLIV value in a line, a PUSCH mapping type, and a slot in which a PUSCH is transmitted (e.g., the information may be configured in the form of a table), via RRC configuration. Subsequently, in the time domain resource assignment of the DCI, a BS transfers, to a UE, information associated with an SLIV value, a PUSCH mapping type, and a slot in which a PUSCH is transmitted by indicating an index value configured in the table.

In the NR system, a PUSCH mapping type may include type A and type B. According to PUSCH mapping type A, the first symbol of demodulation reference signal (DMRS) symbols may be located in the second or third OFDM symbol in a slot. According to PUSCH mapping type B, the first symbol of DMRS symbols may be located in the first OFDM symbol in the time domain resource allocated via PUSCH transmission.

The DCI is transmitted via a physical downlink control channel (PDCCH) after a channel coding and modulation process. In the disclosure, transmission of control information via a PDCCH or a PUCCH may be expressed as transmission of a PDCCH or a PUCCH. In the same manner, transmission of data via a PUSCH or a PDSCH may be expressed as transmission of a PUSCH or a PDSCH.

Generally, the DCI is scrambled with a predetermined radio network temporary identifier (RNTI) (or a UE identifier), independently for each UE, a cyclic redundancy check (CRC) is added, and channel coding is performed, whereby each independent PDCCH is configured and transmitted. The PDCCH may be mapped to a control resource set (CORESET) configured for a UE, and may be transmitted. Downlink data may be transmitted via a physical downlink shared channel (PDSCH) which is a physical channel for downlink data transmission. The PDSCH may be transmitted after the control channel transmission interval. The scheduling information such as a detailed mapping location in the frequency domain, a modulation scheme, and the like may be determined based on the DCI transmitted via the PDCCH.

Via an MCS in the control information included in the DCI, a BS may report a modulation scheme applied to the PDSCH to be transmitted to a UE, and the size (transport block size (TBS)) of data to be transmitted. In an embodiment, the MCS may include 5 bits, or may include more or fewer bits than 5 bits. The TBS corresponds to a size before channel coding for error correction is applied to data (transport block (TB)) that the BS desires to transmit.

In the disclosure, a TB may include a medium access control (MAC) header, a MAC control element (CE), one or more MAC service data units (SDU), and padding bits. Alternatively, the TB may be a MAC protocol data unit (PDU) or a unit of data that is delivered from a MAC layer to a physical layer.

The modulation scheme supported by the NR system includes quadrature phase shift keying (QPSK), 16 quadrature amplitude modulation (16QAM), 64QAM, and 256QAM. Modulation orders (Qm) thereof correspond to 2, 4, 6, and 8, respectively. That is, in the case of QPSK modulation, 2 bits are transmitted per symbol. In the case of 16QAM modulation, 4 bits are transmitted per symbol. In the case of 64QAM modulation, 6 bits are transmitted per symbol. In the case of 256QAM modulation, 8 bits are transmitted per symbol.

Figure 2:
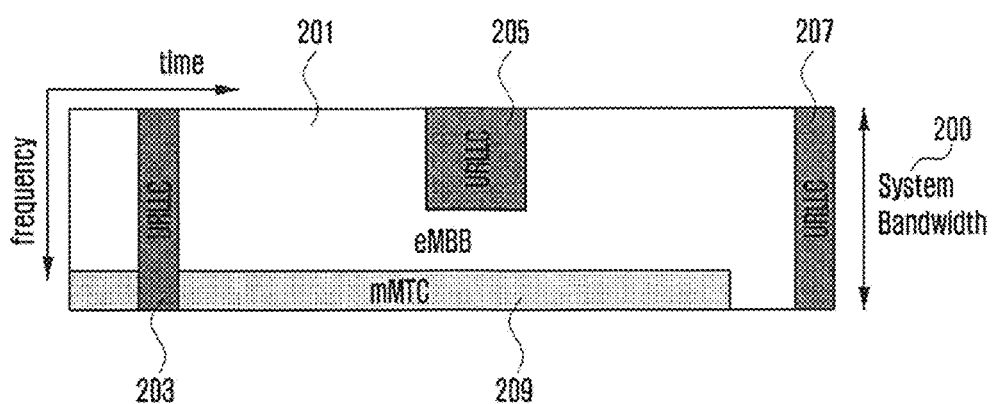
FIG. 2 is a diagram illustrating that data for eMBB, URLLC, and mMTC are allocated in frequency-time resources in a communication system.
Figure 3:
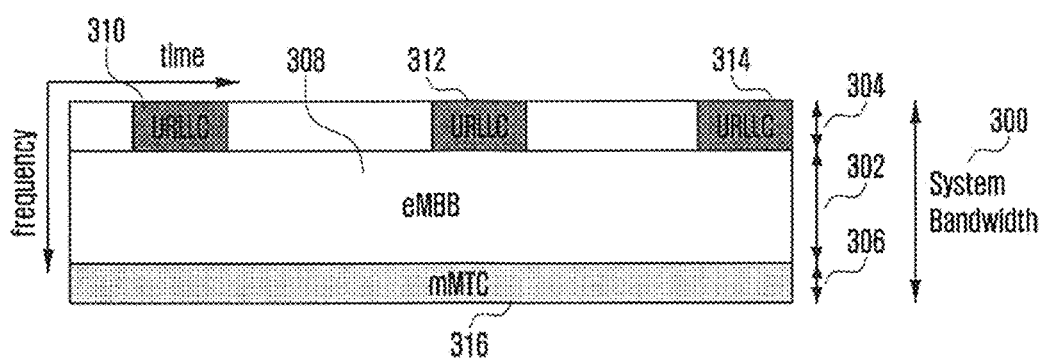
FIG. 3 is a diagram illustrating that data for eMBB, URLLC, and mMTC are allocated in frequency-time resources in a communication system.

FIGS. 2 and 3 are diagrams illustrating data for eMBB, URLLC, and mMTC, which are services considered in 5G or NR systems, allocated in the frequency-time resources.

Referring to FIGS. 2 and 3, a scheme of allocating frequency and time resources for transmitting information in each system is identified.

FIG. 2 illustrates data for eMBB, URLLC, and mMTC allocated in the entire system frequency band 200. If URLLC data 203, 205, and 207 is produced and needs to be transmitted, while eMBB 201 and mMTC 209 are allocated and transmitted in a predetermined frequency band, eMBB 201 and mMTC 209 may empty previously allocated parts or may not perform transmission, so that the URLLC data 203, 205, and 207 may be transmitted. Among the services, URLLC needs to reduce latency, and thus, the URLLC data 203, 205, and 207 may be allocated to a part of the resource 201 where eMBB is allocated, and may be transmitted. If URLLC is additionally allocated and transmitted in the resource in which eMBB is allocated, eMBB data may not be transmitted in the overlapping frequency-time resources. Accordingly, the performance of transmission of the eMBB data may be decreased. In this instance, the transmission of the eMBB data may fail due to the allocation of URLLC.

In FIG. 3, the entire system frequency band 300 may be divided, and each subband 302, 304, and 306 may be used for transmitting a service and data. Information related to configuration of the sub-bands may be determined in advance, and the information may be transmitted from a BS to a UE via higher signaling. Alternatively, a BS or a network node may arbitrarily determine the information related to the sub-bands and provide services without separately transmitting sub-band configuration information to a UE. FIG. 3 illustrates that a sub-band 302 is used for transmission of eMBB data, a sub-band 304 is used for transmission of URCCL data, and a sub-band 306 is used for transmission of mMTC data.

In embodiments of the disclosure, the length of a transmission time interval (TTI) used for URLLC transmission may be shorter than the length of a TTI used for eMBB or mMTC transmission. In addition, a response to information related to URLLC may be transmitted earlier than a response to information related to eMBB or mMTC, and thus, information may be transmitted or received with low latency.

In order to transmit three types of services or data, the structure of a physical layer channel used may differ for each type. For example, at least one of the length of a transmission time interval (TTI), a unit of allocation of a frequency resource, the structure of a control channel, and a data mapping method may be different. Although the description has been provided with reference to three types of services and three types of data, there are various types of services and data corresponding thereto. In this instance, the disclosure may also be applicable.

In order to describe a method and apparatus proposed in the embodiments, terms "physical channel" and "signal" used in the NR system may be used. However, the disclosure may be applicable to a wireless communication system other than the NR system.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be changed according to users, intentions of the users, or customs. Therefore, the definitions of the terms should be made based on the contents throughout the specification.

Hereinafter, a base station is a subject of performing resource allocation with respect to a user equipment, and may be at least one of a gNode B (gNB), an eNode B (eNB), a Node B, a base station (BS), a wireless access unit, a base station controller, or a node on a network. A user equipment (UE) may include a UE, a mobile station (MS), a cellular phone, a smart phone, a computer, or a multimedia system capable of performing a communication function. In the disclosure, a downlink (DL) is a wireless transmission path of a signal that a BS transmits to a UE. An uplink is a wireless transmission path of a signal that a UE transmits to a BS. In addition, although an embodiment of the disclosure is described by taking an NR system as an example, the embodiment of the disclosure may be applicable to other communication systems having a similar technical background or a similar channel type. In addition, an embodiment of the disclosure may be modified by those skilled in the art without departing from the scope of the disclosure, and may be applied to other communication systems.

In the disclosure, terms "physical channel" and "signal" conventionally used may be interchangeably used with terms "data" or "control signal". For example, although a PDSCH is a physical channel that delivers data, a PDSCH may be considered as data in the disclosure.

Hereinafter, higher signaling is signal transferring from a BS to a UE via a downlink data channel of a physical layer, or signal transferring from a UE to a BS via an uplink data channel of a physical layer, which may also be referred to as RRC signaling or MAC control element (CE).

In the embodiments provided below, there is provided a method and apparatus for transmitting or receiving data between a BS and a UE, or between UEs. In this instance, data may be transmitted from a single UE to a plurality of UEs, or data may be transmitted from a single UE to a single UE. Alternatively, data may be transmitted from a BS to a plurality of UEs. However, the disclosure is not limited thereto and may be applied to various cases.

Figure 4:
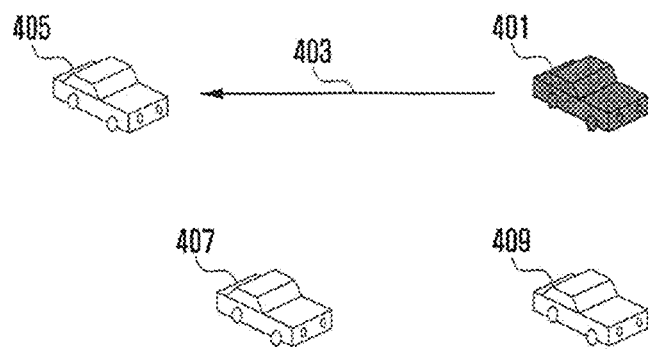
FIG. 4 is a diagram illustrating an example of unicast communication between UEs using a sidelink.

FIG. 4 is a diagram illustrating an example of one-to-one communication performed between two UEs 401 and 405, that is, unicast communication performed via a sidelink.

FIG. 4 illustrates an example in which a signal is transmitted from the first UE 401 to the second UE 405, and signal transmission may be performed in the opposite direction. That is, a signal may be transmitted from the second UE 405 to the first UE 401. Other UEs 407 and 409 excluding the first UE 401 and the second UE 405 may not receive a signal that is exchanged between the first UE 401 and the second UE 405 via unicast. The signal exchanged between the first UE 401 and the second UE 405 via unicast may include a process of mapping in resources agreed on between the first UE 401 and the second UE 405, scrambling using a value agreed on therebetween, mapping control information, transmitting data using a value configured therebetween, identifying a unique ID value of each other, and the like. The UE may be a UE that moves together with a vehicle. Control information, a physical control channel, and data may be separately transmitted for the unicast.

Figure 5:
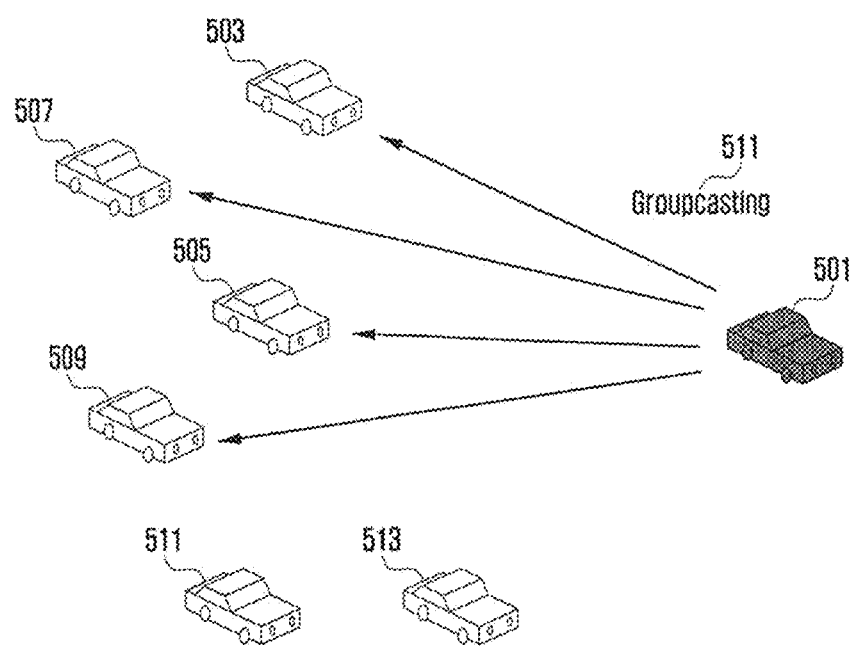
FIG. 5 is a diagram illustrating an example of groupcast communication between UEs using a sidelink.

FIG. 5 is a diagram illustrating an example of groupcast communication 511 in which a single UE 501 transmits common data to a plurality of UEs 503, 505, 507, and 509 via a sidelink.

FIG. 5 illustrates an example in which a first UE 501 transmits a signal to other UEs 503, 505, 507, and 509 in the group, and other UEs 511 and 513 that do not belong to the group may not receive signals transmitted for groupcast.

Figure 6:
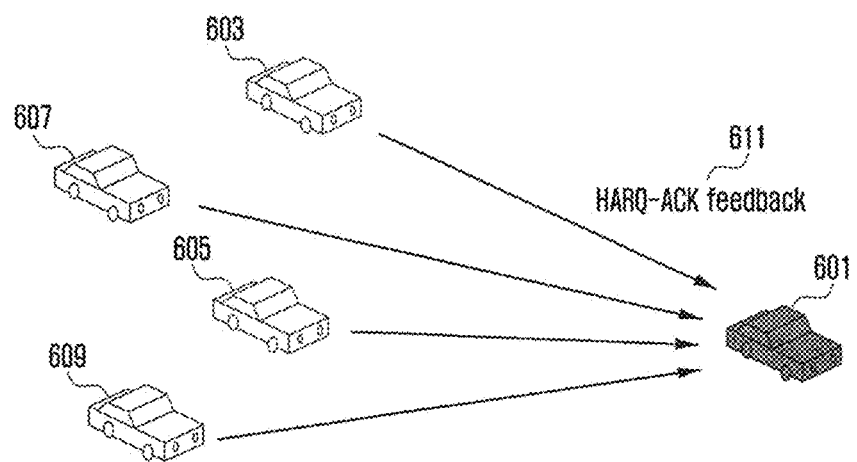
FIG. 6 is a diagram illustrating an example of transmitting a feedback in groupcast communication between UEs using a sidelink.

A UE that transmits a signal for the groupcast may be another UE in the group, resource allocation for signal transmission may be provided by a BS or by a UE that acts as a leader in the group, or may be selected by the UE that transmits the signal. The UE may be a UE that moves together with a vehicle. Control information, a physical control channel, and data may be separately transmitted for the groupcast. FIG. 6 is a diagram illustrating a process in which UEs 603, 605, 607, and 609 to which common data is transmitted via groupcasting transmits information related to successful data reception or data reception failure to a UE 601 that transmits the data. The information may be information such as a HARQ-ACK feedback in operation 611. In addition, the UEs may be UEs having an LTE-based sidelink function or an NR-based sidelink function. If a UE that only has an LTE-based sidelink function may be incapable of transmitting or receiving an NR-based sidelink signal and a physical channel. In the disclosure, a sidelink may be interchangeably used with PC5 or V2X or D2D. Although FIGS. 5 and 6 describe examples of transmission or reception via groupcasting, this may also be applied to unicast signal transmission or reception between UEs.

Figure 7:
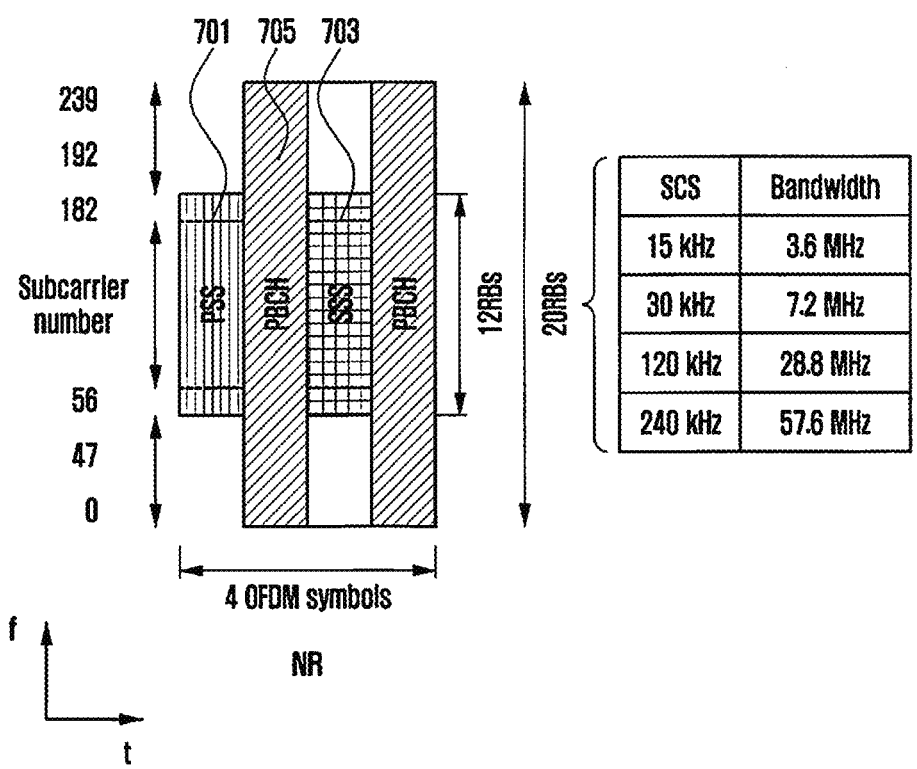
FIG. 7 is a diagram illustrating a synchronization signal and a physical broadcast channel (PBCH) of an NR system which are mapped to the frequency and time domain.

FIG. 7 is a diagram illustrating a synchronization signal of an NR system and a physical broadcast channel (PBCH) which are mapped to the frequency and time domain.

A primary synchronization signal (PSS) 701, a secondary synchronization signal (SSS) 703, and PBCHs are mapped to 4 OFDM symbols. Each of the PSS and the SSS is mapped to 12 RBs and the PBCH is mapped to 20 RBs. The table in FIG. 7 shows the frequency band of 20 RBs that varies depending on a subcarrier spacing (SCS). A resource region in which the PSS, SSS, and PBCH are transmitted is referred to as an SS/PBCH block (SS/PBCH block). In addition, the SS/PBCH block may be referred to as an SSB block.

Figure 8:
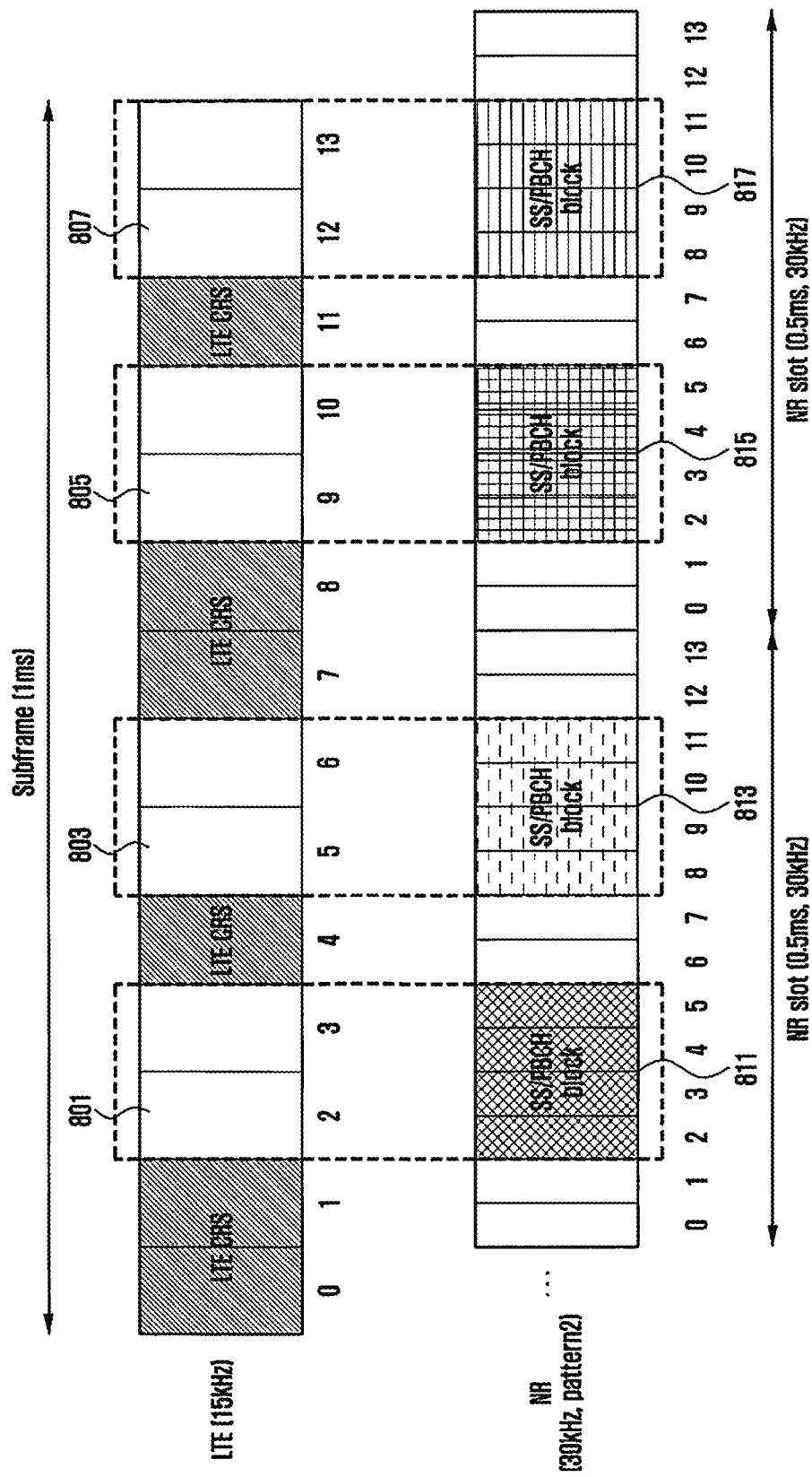
FIG. 8 is a diagram illustrating symbols to which one SS/PBCH block is mapped in a slot.

FIG. 8 is a diagram illustrating symbols to which one SS/PBCH block is mapped in a slot.

FIG. 8 illustrates an example of a legacy LTE system that uses a subcarrier spacing of 15 kHz and an NR system that uses a subcarrier spacing of 30 kHz. It is designed that SS/PBCH blocks 811, 813, 815, and 817 of the NR system are transmitted at locations 801, 803; 805, and 807 where the SS/PBCH blocks avoid cell-specific reference signals (a cell-specific reference signal; CRS) that are always transmitted in the LTE system. This is to enable the LTE system and the NR system to coexist in a single frequency band.

Figure 9:
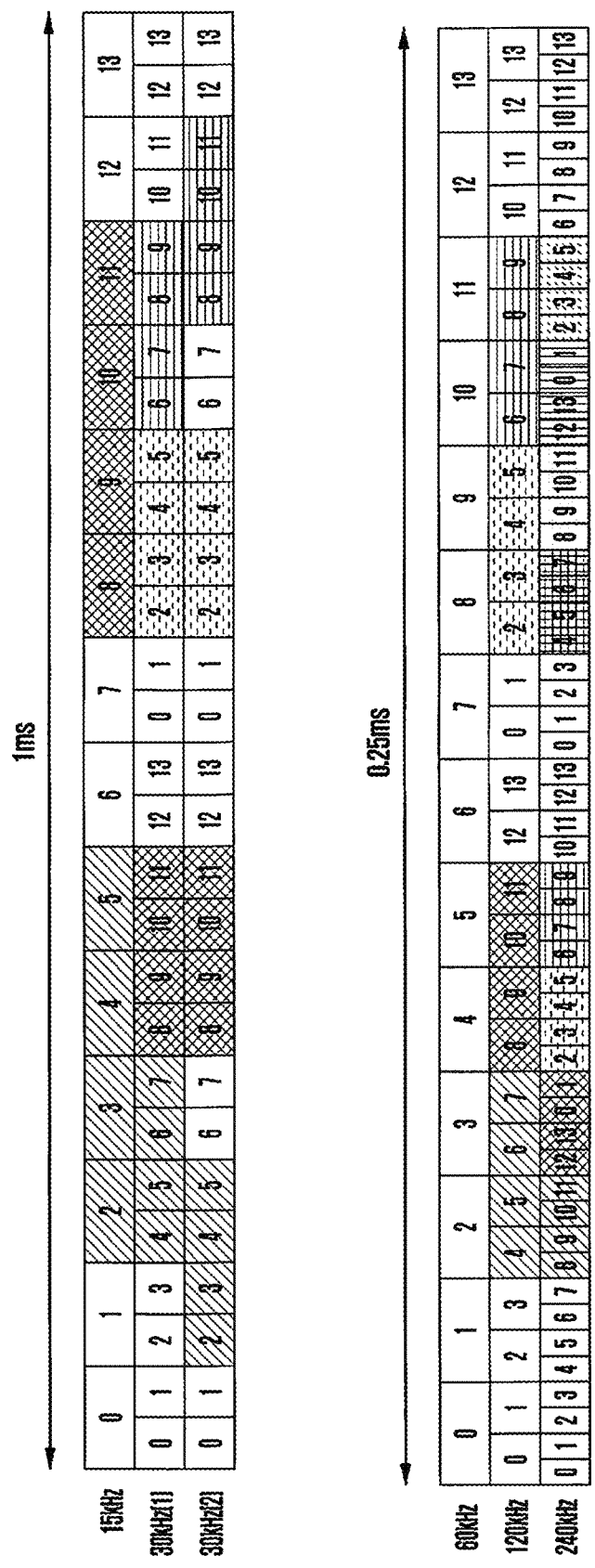
FIG. 9 is a diagram illustrating symbols in which an SS/PBCH block is capable of being transmitted according to a subcarrier spacing (SCS)

FIG. 9 is a diagram illustrating symbols in which an SS/PBCH block is capable of being transmitted according to a subcarrier spacing (SCS).

Referring to FIG. 9, a subcarrier spacing may be set to be 15 kHz, 30 kHz, 120 kHz, 240 kHz, or the like, and the location of a symbol in which an SS/PBCH block (or SSB block) is capable of being located may be determined based on each subcarrier spacing. FIG. 9 illustrates the location of a symbol in which an SSB is capable of being transmitted according to a subcarrier spacing among symbols within 1 ms, but it is not that an SSB is always transmitted in the region marked in FIG. 9. Therefore, the location in which an SSB block is transmitted may be configured for a UE via system information or dedicated signaling.

Figure 10:
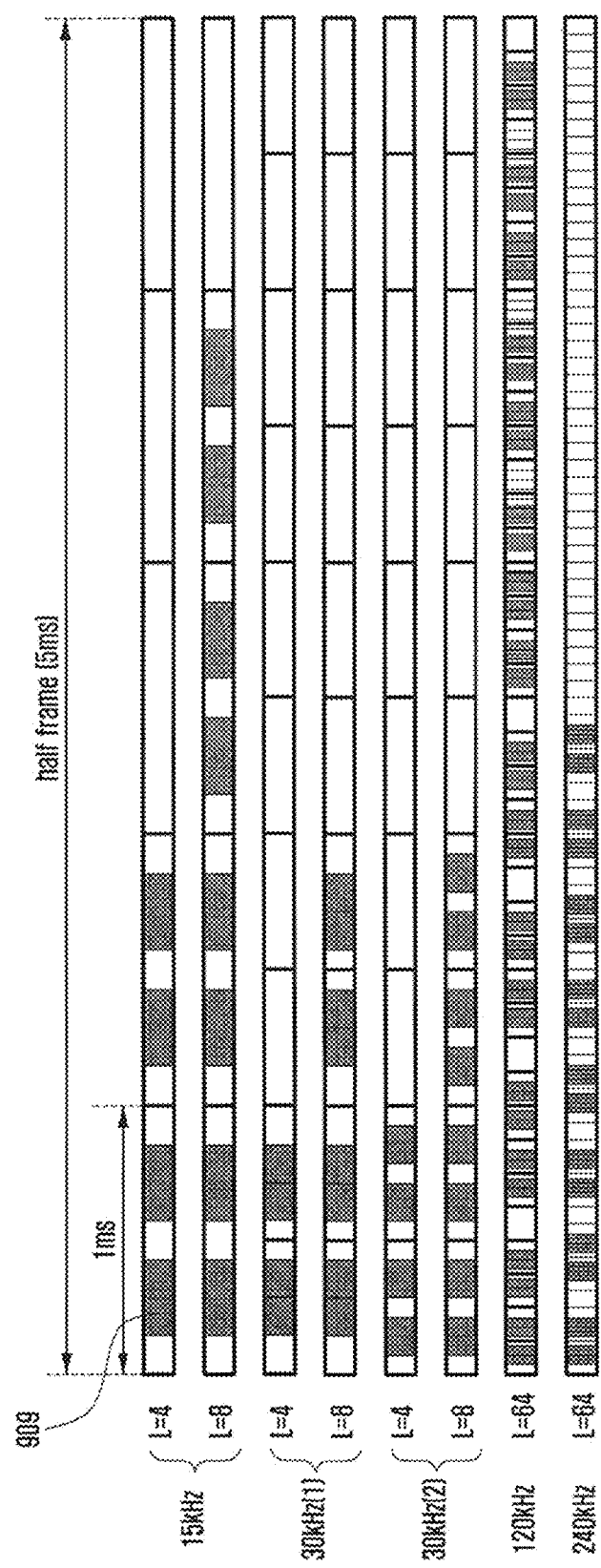
FIG. 10 is another diagram illustrating symbols in which an SS/PBCH block is capable of being transmitted according to an SCS.

FIG. 10 is another diagram illustrating symbols in which an SS/PBCH block is capable of being transmitted according to a subcarrier spacing.

Referring to FIG. 10, an SCS may be set to be 15 kHz, 30 kHz, 120 kHz, 240 kHz, or the like, and the location of a symbol in which an SS/PBCH block (or SSB block) is capable of being located may be determined based on each subcarrier spacing. FIG. 10 illustrates the location of a symbol in which an SSB block is capable of being transmitted according to a subcarrier spacing among symbols within 5 ms. In addition, the location in which the SSB block is transmitted may be configured for a UE via system information or dedicated signaling. It is not that an SS/PBCH block always needs to be transmitted in a region where the SS/PBCH block is capable of being transmitted, and transmission may or may not be performed depending on selection made by a BS. Therefore, the location in which an SSB block is transmitted may be configured for a UE via system information or dedicated signaling.

In the disclosure, a sidelink control channel may be referred to as a physical sidelink control channel (PSCCH), and a sidelink shared channel or data channel may be referred to as a physical sidelink shared channel (PSSCH). In addition, a broadcasting channel broadcasted together with a synchronization signal may be referred to as a physical sidelink broadcast channel (PSBCH), and a channel for feedback transmission may be referred to as a physical sidelink feedback channel (PSFCH). In this instance, transmission may be performed via a PSCCH or a PSSCH for feedback transmission. Depending on a communication system for transmission, it may be referred to as an LTE-PSCCH, an LTE-PSSCH, an NR-PSCCH, an NR-PSSCH, or the like. In the disclosure, a sidelink is the link between UEs, and a Uu link is the link between a BS and a UE.

If a BS allocates a resource to a UE for uplink transmission in a wireless communication system, the UE may report a power headroom for power control. In the legacy communication between UEs, communication is not performed via unicast or groupcast, and thus, a power headroom does not need to be reported. However, in sidelink communication, communication may be performed via unicast or groupcast and thus, there is a desire for a method of reporting a power headroom. In addition, if a UE that performs communication via a sidelink is also connected to a BS, there is a desire for a method of reporting a power headroom. Hereinafter, a detailed method of reporting a power headroom is provided.

First Embodiment

Figure 11:
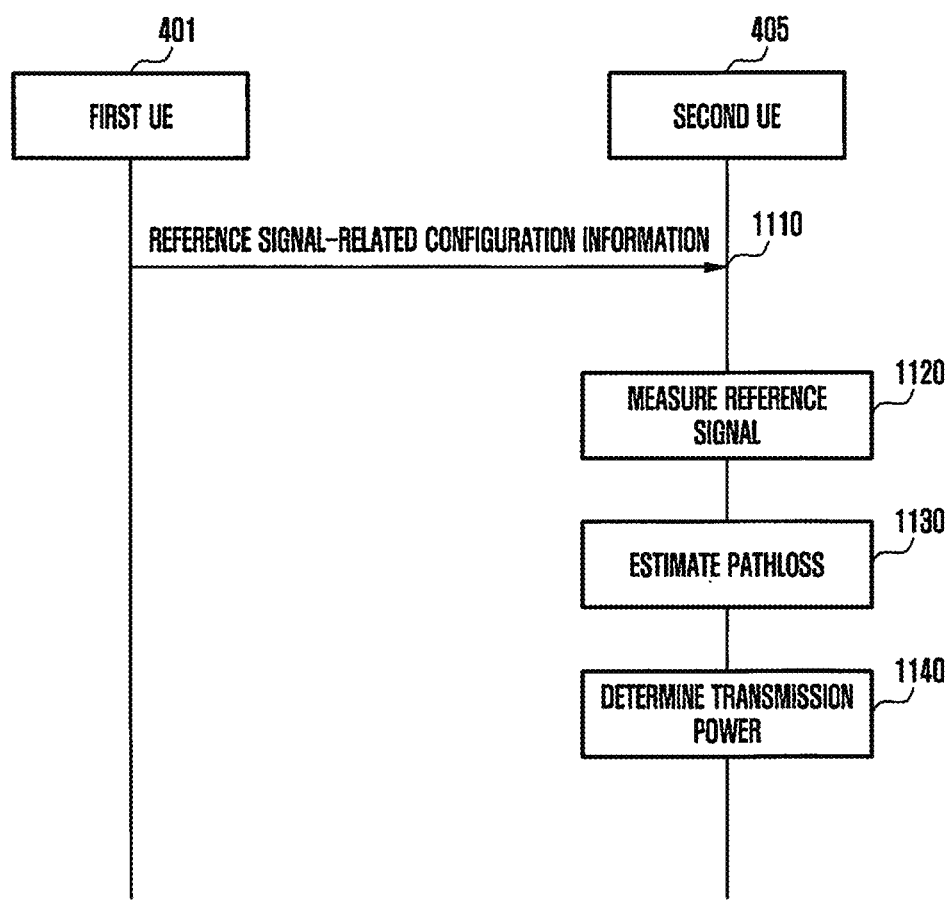
FIG. 11 is a diagram illustrating a method of reporting a power headroom of a UE for sidelink communication according to a first embodiment of the disclosure.

FIG. 11 is a diagram illustrating a method of reporting a power headroom of a UE for sidelink communication according to a first embodiment of the disclosure. First, in the case of unicast communication in a sidelink as shown in FIG. 4, a method of signal transmission or reception between the first UE 401 and the second UE 405, estimating a pathloss, and controlling power using the same will be described with reference to FIG. 11. In the disclosure, UEs are referred to as a transmission (Tx) UE (or a first UE) and a reception (Rx) UE (a second UE) for ease of description, but the operation performed by a UE is not limited by its name. For example, the first UE 401 corresponding to a Tx UE is capable of receiving a signal, in addition to transmitting a signal. In the same manner, the second UE 405 corresponding to an Rx UE is also capable of transmitting a signal, in addition to receiving a signal.

Referring to FIG. 11, in operation 1110, the first UE 401 transmits configuration information related to a reference signal (e.g., information associated with a reference signal and power used for reference signal transmission) to the second UE 405.

In operation 1120, the second UE 405 measures the reference signal transmitted from the first UE 401, and calculates reception power.

The second UE may estimate a pathloss between the first UE and the second UE in operation 1130. The second UE may estimate the pathloss between the first UE and the second UE based on information associated with the transmission power of the reference signal received in operation 1110 and the reception power measured in operation 1120.

For example, the pathloss may be the difference between the transmission power of the signal transmitted from the first UE 401 and the reception power measured by the second UE 405. This may be a reference signal received power (RSRP). The RSRP may be a linear average value of power transmitted in a resource element in which a predetermined reference signal is mapped and is transmitted, and may be expressed as a Watt. For example, an SSS, a channel state information reference signal (CSI-RS), or a sounding reference signal (SRS), or the like may be used as a reference signal for measuring an RSRP.

The second UE may determine a transmission power for newly transmitting a feedback or a signal to the first UE in operation 1140. In this instance, the second UE may calculate the transmission power based on the pathloss calculated in operation 1130. For example, the transmission power may be calculated as shown in the following equation.

$$P_{PSSCH} = \min\{P_{cmax}, P_{O\_PSSCH} + 10\log_{10}(2^{\mu} \cdot M_{RB}^{PSSCH}) + \alpha \cdot PL\}$$

In the above, $P_{cmax}$ denotes the maximum transmission power that a UE is capable of using. $P_{O\_PSSCH}$ and $\alpha$ may be information shared between the first UE and the second UE via higher signaling.

The high signaling may be an RRC signaling for a sidelink such as PC5-RRC, may be a MAC CE, or may be information high-signaled from a BS. min{a,b} denotes the small value between a and b.

In the equation, PL may be the pathloss value measured in operation 1130. $\mu$ may be information associated with a numerology, and for example, may be information associated with a subcarrier spacing. For example, $\mu=0, 1, 2, 3$ may be values indicating 15 kHz, 30 kHz, 60 kHz, and 120 kHz, respectively. $M_{RB}^{PSSCH}$ denotes the size of a frequency resource to be used for sidelink data transmission, that is, a PSSCH. For example, $M_{RB}^{PSSCH}$ may be an RB unit. The equation may be modified in various methods and may be applied. For example, the second UE 405 may receive, from the first UE 401, control information associated with power control, and may calculate a transmission power based on the received power control information and the following equation.

$$P_{PSSCH} = \min\{P_{cmax}, P_{O\_PSSCH} + 10\log_{10}(2^{\mu} \cdot M_{RB}^{PSSCH}) + \alpha \cdot PL + \Delta_{TF} + f\}$$

$\Delta_{TF}$ and f may be values determined based on one, or a combination of two pieces of information, among control information transferred via a physical channel and higher signaling, such as PC5-RRC, between the first UE and the second UE. The second UE may report a power headroom to the first UE. In this instance, the power headroom may be based on information used for determining the transmission power, and the method of determining the power headroom is described later.

Figure 12:
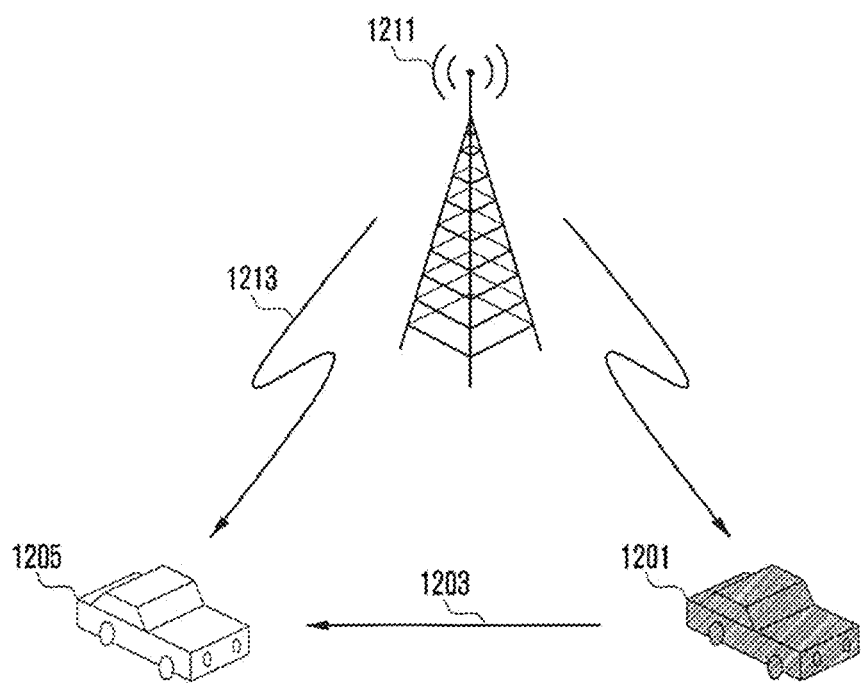
FIG. 12 is a diagram illustrating an example of the case in which a pathloss in a path from a base station (BS) is measurable in unicast communication in a sidelink.

FIG. 12 is a diagram illustrating an example of the case in which a first UE 1201 and a second UE 1205 are connected to a BS or are capable of measuring a pathloss in a path from a BS, in the case of unicast communication in a sidelink.

Referring to FIG. 12, if the second UE 1205 is adjacent to the BS, a signal that the UE transmits for sidelink communication may act as interference when the BS receives an uplink signal. Therefore, when reporting a power headroom, the second UE 1205 may need to take into consideration a pathloss 1213 associated with the BS 1211 in addition to a pathloss 1203 associated with the first UE 1201.

Figure 13:
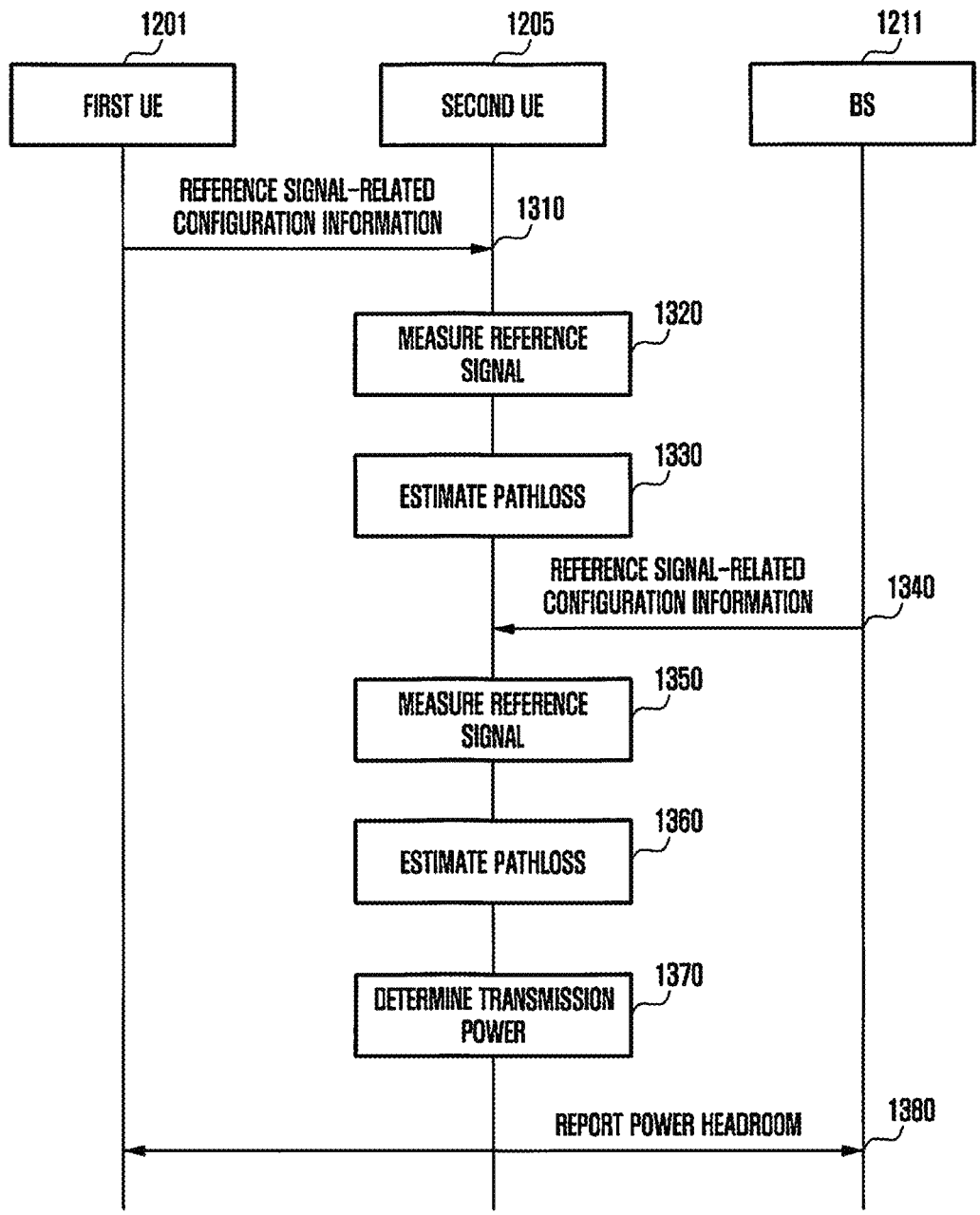
FIG. 13 is a diagram illustrating a method of reporting a power headroom of a UE for sidelink communication according to a first embodiment of the disclosure.

A detailed description thereof will be provided from FIG. 13. FIG. 13 is a diagram illustrating a method of reporting a power headroom of a UE for sidelink communication according to the first embodiment of the disclosure.

The second UE 1205 may measure the pathloss $PL_{SL}$ of a link 1203 with the first UE 1201 in operations 1310 to 1330, similar to operations 1110 to 1130. In addition, the second UE 1205 may measure the pathloss $PL_{Uu}$ of a link 1213 from the BS 1211 in operations 1340 to 1360. A detailed description thereof will be described below.

Referring to FIG. 13, in operation 1310, the first UE 1201 transmits configuration information related to a reference signal (e.g., information associated with a reference signal and power used for reference signal transmission) to the second UE 1205.

In operation 1320, the second UE 1205 measures the reference signal transmitted from the first UE 1201, and calculates a reception power.

The second UE may estimate a pathloss between the first UE and the second UE in operation 1330. The second UE may estimate the pathloss $PL_{SL}$ of a link 1203 between the first UE 1201 and the second UE 1205 based on information associated with the transmission power of the reference signal received in operation 1310 and the reception power measured in operation 1320.

For example, the pathloss may be the difference between the transmission power of the signal transmitted from the first UE 1201 and the reception power measured by the second UE 1205. This may be an RSRP. The RSRP may be a linear average value of power transmitted in a resource element in which a predetermined reference signal is mapped and is transmitted, and may be expressed as a Watt. For example, an SSS, a CSI-RS, a sounding reference signal (SRS), or the like may be used as a reference signal for measuring an RSRP.

In operation 1340, the BS 1211 transmits configuration information related to a reference signal (e.g., information associated with a reference signal and power used for reference signal transmission) to the second UE 1205.

In operation 1350, the second UE may measure the reference signal transmitted from the BS 1211 and may calculate a reception power.

The second UE may estimate a pathloss between the BS and the second UE in operation 1360. The second UE may estimate the pathloss $PL_{Uu}$ of a link 1213 between the BS 1211 and the second UE 1205 based on information associated with the transmission power of the reference signal received in operation 1340 and the reception power measured in operation 1350.

For example, the pathloss may be the difference between the transmission power of the signal transmitted from the BS 1211 and the reception power measured by the second UE 1205. This may be an RSRP. The RSRP may be a linear average value of power transmitted in a resource element in which a predetermined reference signal is mapped and is transmitted, and may be expressed as a Watt. For example, an SSS, a CSI-RS, a sounding reference signal (SRS), or the like may be used as a reference signal for measuring an RSRP.

Operations S1310 to S1330 and operations S1340 to S1360 may be performed in a different order. That is, the process in which the second UE receives configuration information related to a reference signal from the BS and estimates a pathloss, and the process in which the second UE receives configuration information related to a reference signal from the first UE and estimates a pathloss may be performed in parallel, or in a different order.

The second UE may calculate power for sidelink data transmission of the second UE 1205 in operation 1370. In addition, in operation 1380, the second UE may report a power headroom of the second UE 1205 to the BS 1211 or the first UE 1201.

Particularly, the second UE may determine the transmission power for newly transmitting feedback or a signal to the first UE 1201 in operation 1370. In this instance, the second UE may calculate the transmission power based on the calculated pathloss $PL_{SL}$ of the link 1203 with the first UE and the pathloss $PL_{Uu}$ of the link 1213 with the BS. For example, the transmission power may be calculated as shown in the following equation.

$$P_{PSSCH} = \min\{P_{cmax}, P_{O\_PSSCH} + 10 \log_{10}(2^\mu \cdot M_{RB}^{PSSCH}) + \alpha_{SL} \cdot PL_{SL}, P_{O\_PSSCH} + 10 \log_{10}(2^\mu \cdot M_{RB}^{PSSCH}) + \alpha_{Uu} \cdot PL_{Uu}\}$$

In the equation, min (a,b,c) denotes the smallest value among a, b, and c. In the equation, $$P_{O\_PSSCH} + 10 \log_{10}(2^\mu \cdot M_{RB}^{PSSCH}) + \alpha_{SL} \cdot PL_{SL}$$

is a transmission power value calculated in consideration of the pathloss of a sidelink when the second UE 1205 transmits a signal and the signal is delivered to the first UE 1201 via the sidelink.

$$P_{O\_PSSCH} + 10 \log_{10}(2^\mu \cdot M_{RB}^{PSSCH}) + \alpha_{SL} \cdot PL_{SL}$$

is a value calculated in consideration of a reception power when the second UE 1205 transmits a signal and the signal is delivered to the BS 1211 via a link with the BS. In the equation, $\alpha_{SL}$ and $\alpha_{Uu}$ may be parameter values transferred to the second UE 1205 via higher signaling. In the equation, $$P_{O\_PSSCH} + 10 \log_{10}(2^\mu \cdot M_{RB}^{PSSCH}) + \alpha_{SL} \cdot PL_{SL}$$

may be modified to, for example, $$P_{O\_PSSCH} + 10 \log_{10}(2^\mu \cdot M_{RB}^{PSSCH}) + \alpha_{SL} \cdot PL_{SL} + \Delta_{TF,SL} + f_{SL},$$

and may be applied. Here, $\Delta_{TF,SL}$ and $f_{SL}$ may be values determined based on one, or a combination of two pieces of information, among control information transferred via a physical channel and higher signaling, such as PC5-RRC, between the first UE 1201 and the second UE 1205. Alternatively, $\Delta_{TF,SL}$ and $f_{SL}$ may be values determined based on one, or a combination of two pieces of information, among control information transferred via a physical channel and higher signaling, such as RRC, between the BS 1211 and the second UE 1205. In addition, in the equation, $$P_{O\_PSSCH} + 10 \log_{10}(2^\mu \cdot M_{RB}^{PSSCH}) + \alpha_{SL} \cdot PL_{Uu}$$

may be modified to, for example, $$P_{O\_PSSCH} + 10 \log_{10}(2^\mu \cdot M_{RB}^{PSSCH}) + \alpha_{SL} \cdot PL_{Uu} + \Delta_{TF,Uu} + f_{Uu},$$

and may be applied. Here, $\Delta_{TF,Uu}$ and $f_{Uu}$ may be values determined based on one, or a combination of two pieces of information, among downlink control information transferred via a physical channel and higher signaling, such as RRC, between the BS 1211 and the second UE 1205.

In operation 1380, the second UE may transfer a power headroom report (PHR) to the first UE 1201 or the BS based on calculating of power to be used for transmitting a sidelink physical channel or signal. That is, the second UE may determine the power headroom based on the information used for calculating the transmission power. The power headroom may be determined based on the equation below.

$$PH = \max\{P_{cmax} - P_{SL}^{calculated}, P_{cmax} - P_{Uu}^{calculated}\}$$

In the equation, $P_{cmax}$ denotes the maximum transmission power that the second UE 1205 is capable of using based on information configured for the second UE 1205 or the like.

In the equation, $P_{SL}^{calculated}$ is a transmission power calculated in consideration of a pathloss or the like when the second UE 1205 transmits a signal to the first UE 1201, and may be defined as, for example, $$P_{SL}^{calculated} = P_{O\_PSSCH} + 10 \log_{10}(2^\mu \cdot M_{RB}^{PSSCH}) + \alpha_{SL} \cdot PL_{SL}$$

or $$P_{SL}^{calculated} = P_{O\_PSSCH} + 10 \log_{10}(2^\mu \cdot M_{RB}^{PSSCH}) + \alpha_{SL} \cdot PL_{SL} + \Delta_{TF,SL} + f_{SL}.$$

$P_{Uu}^{calculated}$ is a transmission power calculated in consideration of an approximate reception power when the second UE 1205 transmits a signal to the BS 1211, and may be defined as $$P_{Uu}^{calculated} = P_{O\_PSSCH} + 10 \log_{10}(2^\mu \cdot M_{RB}^{PSSCH}) + \alpha_{Uu} \cdot PL_{Uu}$$

or $$P_{Uu}^{calculated} = P_{O\_PSSCH} + 10 \log_{10}(2^\mu \cdot M_{RB}^{PSSCH}) + \alpha_{Uu} \cdot PL_{Uu} + \Delta_{TF,Uu} + f_{Uu}.$$

Figure 14:
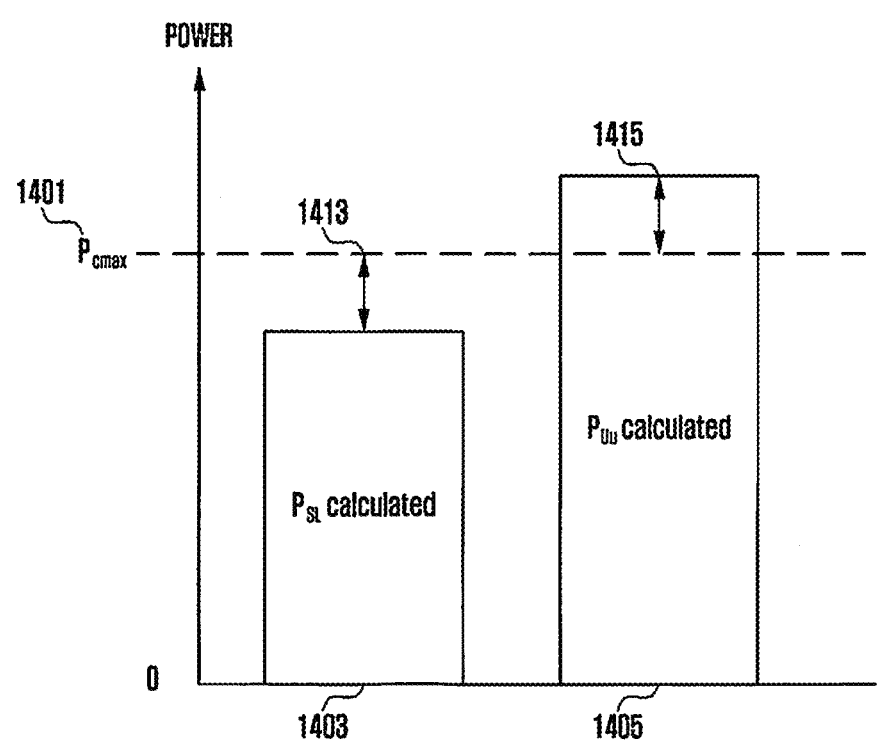
FIG. 14 is a diagram illustrating an example of calculating the maximum power that a UE is capable of transmitting, and a transmission power transmitted in a sidelink and a Uu link, and comparing them.

According to the equation, in the example of FIG. 14, a value 1413 is reported and, in this instance, it is a positive value. A detailed description thereof will be described below.

FIG. 14 is a diagram illustrating an example of calculating the maximum power that a UE is capable of transmitting, and a transmission power transmitted in a sidelink and a Uu link, and comparing them.

Referring to FIG. 14, $P_{cmax}$ 1410 is the maximum transmission power that a UE is capable of using. $P_{SL}^{calculated}$ 1420 is a transmission power calculated in consideration of a loss in the link between a second UE and a first UE. $P_{Uu}^{calculated}$ 1430 is a transmission power calculated in consideration of a loss in the link between the second UE and a BS.

In the situation of FIG. 14, if the method of determining a power headroom of FIG. 13 is applied, $P_{cmax} - P_{SL}^{calculated}$ is a positive value 1413 and $P_{cmax} - P_{Uu}^{calculated}$ is a negative value 1215. In this instance, a max value is used and thus, a power headroom is a positive value.

There may be instances where the UE reports a PH having a negative value in operation 1380.

Although it is illustrated that the power headroom is determined based on $$PH = \max\{P_{cmax} - P_{SL}^{calculated}, P_{cmax} - P_{Uu}^{calculated}\}$$

in operation 1380, various methods of determining a power headroom may be applied.

Second Embodiment

Figure 15:
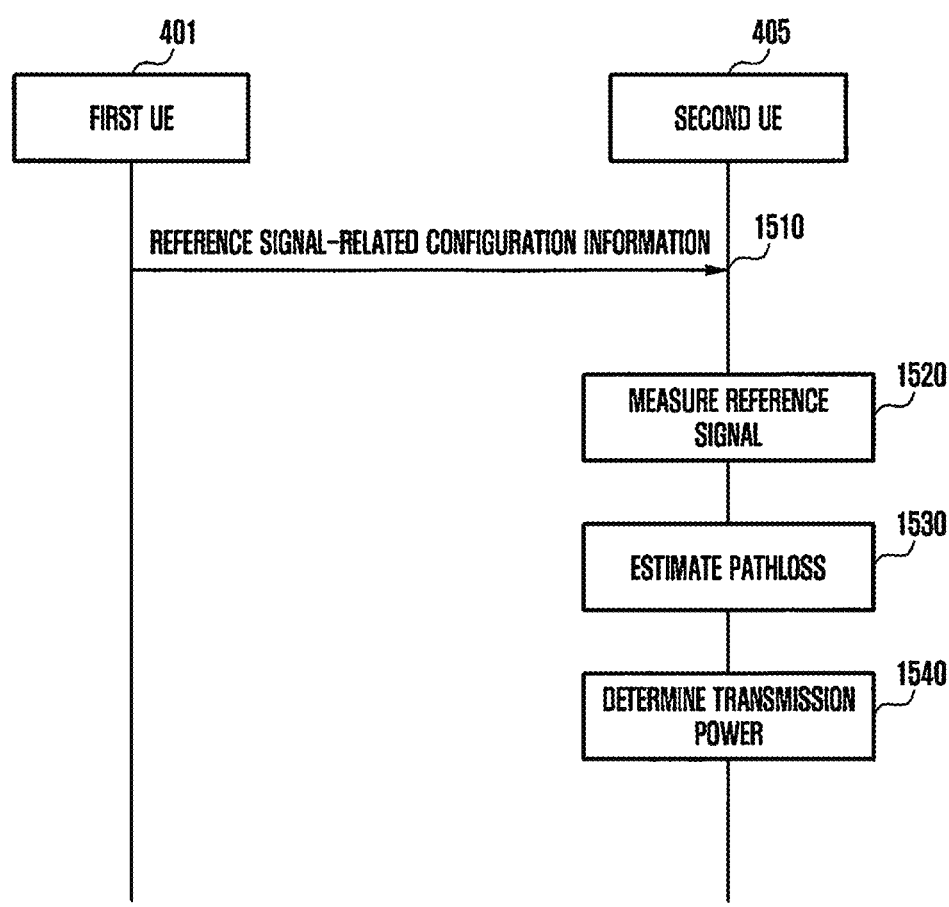
FIG. 15 is a diagram illustrating a method of reporting a power headroom of a UE for sidelink communication according to a second embodiment of the disclosure.

FIG. 15 is a diagram illustrating a method of reporting a power headroom of a UE for sidelink communication according to a second embodiment of the disclosure. First, in the case of unicast communication in a sidelink as shown in FIG. 4, a method of signal transmission or reception between the first UE 401 and the second UE 405, estimating a pathloss, and controlling power using the same will be described with reference to FIG. 15. In the disclosure, UEs are referred to as a transmission (Tx) UE (or a first UE) and a reception (Rx) UE (a second UE), but the operation performed by a UE is not limited by its name. For example, the first UE 401 corresponding to a Tx UE is capable of receiving a signal, in addition to transmitting a signal. In the same manner, the second UE 405 corresponding to an Rx UE is also capable of transmitting a signal, in addition to receiving a signal. Referring to FIG. 15, in operation 1510, the first UE 401 transmits configuration information related to a reference signal (e.g., information associated with a reference signal and power used for reference signal transmission) to the second UE 405.

In operation 1520, the second UE 405 may measure the reference signal transmitted from the first UE 401, and calculates a reception power.

The second UE may estimate a pathloss between the first UE and the second UE in operation 1530. The second UE may estimate a pathloss between the first UE and the second UE based on information associated with the transmission power of the reference signal received in operation 1510 and the reception power measured in operation 1520.

For example, the pathloss may be the difference between the transmission power of the signal transmitted from the first UE 401 and the reception power measured by the second UE 405. This may be a reference signal received power (RSRP). The RSRP may be a linear average value of power transmitted in a resource element in which a predetermined reference signal is mapped and is transmitted, and may be expressed as a Watt. For example, an SSS, a CSI-RS, an SRS, or the like may be used as a reference signal for measuring an RSRP.

The second UE may determine a transmission power for newly transmitting feedback or a signal to the first UE in operation 1540. In this instance, the second UE may calculate the transmission power based on the pathloss calculated in operation 1530. For example, the transmission power may be calculated as shown in the following equation.

$$P_{PSSCH} = \min\{P_{cmax}, P_{O\_PSSCH} + 10 \log_{10}(2^{\mu} \cdot M_{RB}^{PSSCH}) + \alpha 19 PL\}$$

In the above, $P_{cmax}$ denotes the maximum transmission power that a UE is capable of using. $P_{O\_PSSCH}$ and $\alpha$ may be information shared between the first UE and the second UE via higher signaling.

The high signaling may be an RRC signaling for a sidelink such as PC5-RRC, may be a MAC CE, or may be information high-signaled from a BS. min{a,b} denotes the small value between a and b.

In the equation, PL may be the pathloss value measured in operation 1530. $\mu$ may be information associated with a numerology, and for example, may be information associated with a subcarrier spacing. For example, $\mu=0, 1, 2, 3$ may be values indicating 15 kHz, 30 kHz, 60 kHz, and 120 kHz, respectively. $M_{RB}^{PSSCH}$ denotes the size of a frequency resource to be used for sidelink data transmission, that is, a PSSCH. For example, $M_{RB}^{PSSCH}$ may be an RB unit.

The equation may be modified in various methods and may be applied. For example, the second UE 405 may receive, from the first UE 401, control information associated with power control, and may calculate a transmission power based on the received power control information and the following equation.

$$P_{PSSCH} = \min\{P_{cmax}, P_{O\_PSSCH} + 10 \log_{10}(2^{\mu} \cdot M_{RB}^{PSSCH}) + \alpha \cdot PL + \Delta_{TF} + f\}$$

In the equation, $\Delta_{TF}$ and f may be values determined based on one, or a combination of two pieces of information, among control information transferred via a physical channel and higher signaling, such as PC5-RRC, between the first UE and the second UE.

The second UE may report a power headroom to the first UE. In this instance, the power headroom may be based on the information used for determining the transmission power, and the method of determining the power headroom is described later.

Figure 16:
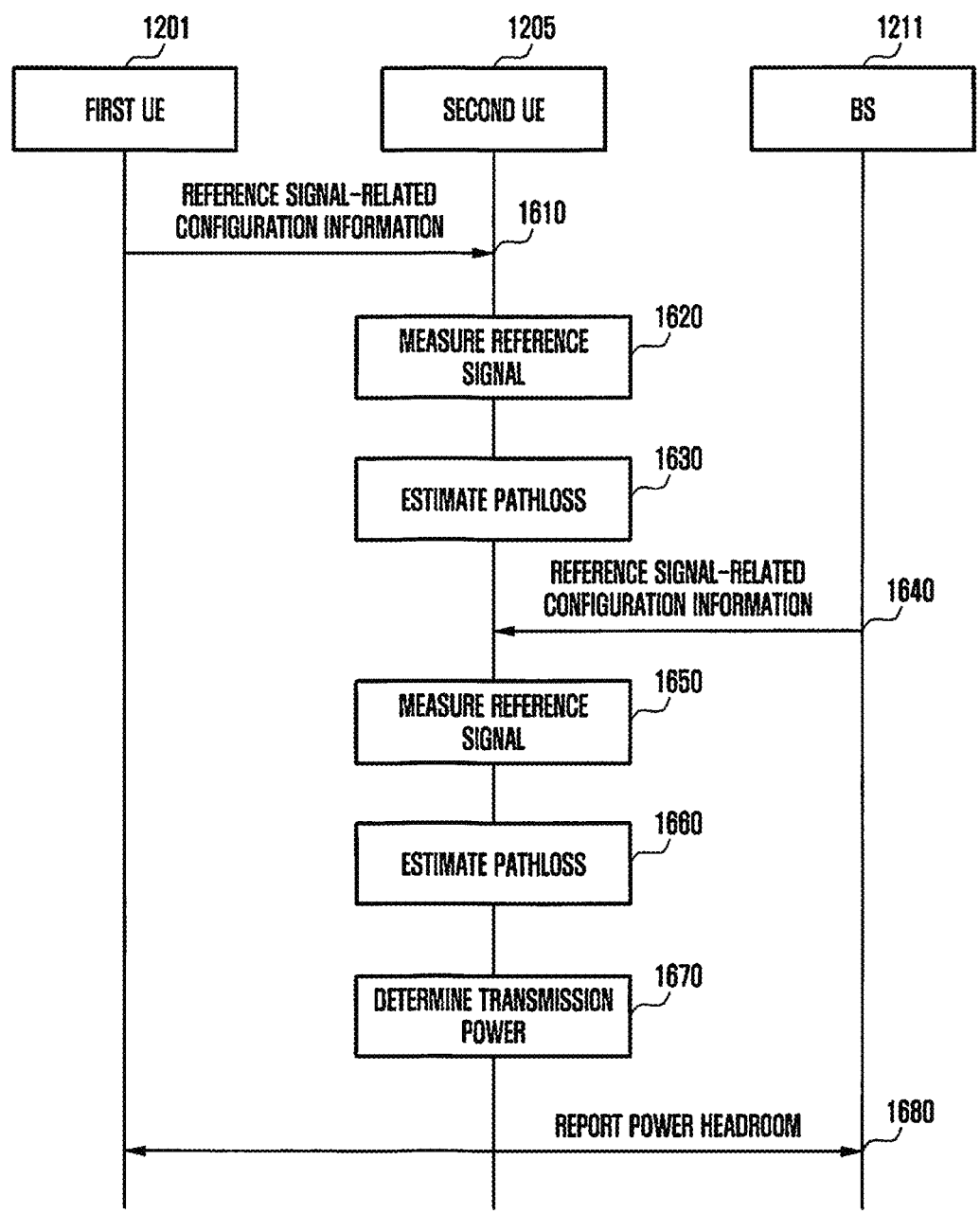
FIG. 16 is a diagram illustrating a method of reporting a power headroom of a UE for sidelink communication according to the second embodiment of the disclosure.

FIG. 16 is a diagram illustrating a method of reporting a power headroom of a UE for sidelink communication according to the second embodiment of the disclosure.

The second UE 1205 may measure the pathloss $PL_{SL}$ of the link 1203 with the first UE 1201 in operations 1610 to 1630, similar to operations 1510 to 1530. In addition, the second UE 1205 may measure the pathloss $PL_{Uu}$ of the link 1213 from the BS 1211 in operations 1640 to 1660. A detailed description thereof will be described below.

Referring to FIG. 16, in operation 1610, the first UE 1201 transmits configuration information related to a reference signal (e.g., information associated with a reference signal and power used for reference signal transmission) to the second UE 1205.

In operation 1620, the second UE 1205 measures the reference signal transmitted from the first UE 1201, and calculates a reception power.

The second UE may estimate a pathloss between the first UE and the second UE in operation 1630. The second UE may estimate the pathloss $PL_{SL}$ of the link 1203 between the first UE 1201 and the second UE 1205 based on information associated with the transmission power of the reference signal received in operation 1610 and the reception power measured in operation 1620.

For example, the pathloss may be the difference between the transmission power of the signal transmitted from the first UE 1201 and the reception power measured by the second UE 1205. This may be an RSRP. The RSRP may be a linear average value of power transmitted in a resource element in which a predetermined reference signal is mapped and is transmitted, and may be expressed as a Watt. For example, an SSS, a CSI-RS, a sounding reference signal (SRS), or the like may be used as a reference signal for measuring an RSRP.

In operation 1640, the BS 1211 transmits configuration information related to a reference signal (e.g., information associated with a reference signal and power used for reference signal transmission) to the second UE 1205.

In operation 1650, the second UE may measure the reference signal transmitted from the BS 1211 and may calculate a reception power.

The second UE may estimate a pathloss between the BS and the second UE in operation 1660. The second UE may estimate the pathloss $PL_{Uu}$ of the link 1213 between the BS 1211 and the second UE 1205 based on information associated with the transmission power of the reference signal received in operation 1640 and the reception power measured in operation 1650.

For example, the pathloss may be the difference between the transmission power of the signal transmitted from the BS 1201 and the reception power measured by the second UE 1205. This may be an RSRP. The RSRP may be a linear average value of power transmitted in a resource element in which a predetermined reference signal is mapped and is transmitted, and may be expressed as a Watt. For example, an SSS, a CSI-RS, an SRS, or the like may be used as a reference signal for measuring an RSRP.

Operations S1610 to S1630 and operations S1640 to S1660 may be performed in a different order. That is, the process in which the second UE receives configuration information related to a reference signal from the BS and estimates a pathloss, and the process in which the second UE receives configuration information related to a reference signal from the first UE and estimates a pathloss may be performed in parallel, or in a different order.

The second UE may calculate power for sidelink data transmission of the second UE 1205 in operation 1670. In addition, in operation 1680, the second UE may report a power headroom of the second UE 1205 to the BS 1211 or the first UE 1201.

Particularly, the second UE may determine a transmission power for newly transmitting feedback or a signal to the first UE 1201 in operation 1670. In this instance, the second UE may calculate the transmission power based on the calculated pathloss $PL_{SL}$ of the link 1203 with the first UE and the pathloss $PL_{Uu}$ of the link 1213 with the BS. For example, the transmission power may be calculated as shown in the following equation.

$$P_{PSSCH} = \min\{P_{cmax}, P_{O\_PSSCH} + 10 \log_{10}(2^\mu \cdot M_{RB}^{PSSCH}) + \alpha_{SL} \cdot PL_{SL}, P_{O\_PSSCH} + 10 \log_{10}(2^\mu \cdot M_{RB}^{PSSCH}) + \alpha_{Uu} \cdot PL_{Uu}\}$$

In the equation, min (a,b,c) denotes the smallest value among a, b, and c. In the equation, $P_{O\_PSSCH} + 10 \log_{10}(2^\mu \cdot M_{RB}^{PSSCH}) + \alpha_{SL} \cdot PL_{SL}$ is a transmission power value calculated in consideration of the pathloss of a sidelink when the second UE 1205 transmits a signal and the signal is delivered to the first UE 1201 via the sidelink.

$$P_{O\_PSSCH} + 10 \log_{10}(2^\mu \cdot M_{RB}^{PSSCH}) + \alpha_{Uu} \cdot PL_{Uu}$$

is a value calculated in consideration of a reception power when the second UE 1205 transmits a signal and the signal is delivered to the BS 1211 via a link with the BS. In the equation, $\alpha_{SL}$ and $\alpha_{Uu}$ may be parameter values transferred to the second UE 1205 via higher signaling. In the equation, $$P_{O\_PSSCH} + 10 \log_{10}(2^\mu \cdot M_{RB}^{PSSCH}) + \alpha_{SL} \cdot PL_{SL}$$

may be modified to, for example, $$P_{O\_PSSCH} + 10 \log_{10}(2^\mu \cdot M_{RB}^{PSSCH}) + \alpha_{SL} \cdot PL_{SL} + \Delta_{TF,SL} + f_{SL},$$

and may be applied. Here, $\Delta_{TF,SL}$ and $f_{SL}$ may be values determined based on one, or a combination of two pieces of information, among control information transferred via a physical channel and higher signaling, such as PC5-RRC, between the first UE 1201 and the second UE 1205. Alternatively, $\Delta_{TF,SL}$ and $f_{SL}$ may be values determined based on one, or a combination of two pieces of information, among control information transferred via a physical channel and higher signaling, such as RRC, between the BS 1211 and the second UE 1205. In addition, in the equation, $$P_{O\_PSSCH} + 10 \log_{10}(2^\mu \cdot M_{RB}^{PSSCH}) + \alpha_{Uu} \cdot PL_{Uu}$$

may be modified to, for example, $$P_{O\_PSSCH} + 10 \log_{10}(2^\mu \cdot M_{RB}^{PSSCH}) + \alpha_{Uu} \cdot PL_{Uu} + \Delta_{TF,Uu} + f_{Uu},$$

and may be applied. Here, $\Delta_{TF,Uu}$ and $f_{Uu}$ may be values determined based on one, or a combination of two pieces of information, among downlink control information transferred via a physical channel and higher signaling, such as RRC, between the BS 1211 and the second UE 1205.

In operation 1680, the second UE may transfer a power headroom report (PHR) to the first UE 1201 or the BS based on calculating of power to be used for transmitting a sidelink physical channel or signal. That is, the second UE may determine the power headroom based on the information used for calculating the transmission power. The power headroom may be determined based on the equation below.

$$PH = \min\{P_{cmax} - P_{SL}^{calculated}, P_{cmax} - P_{Uu}^{calculated}\}$$

In the equation, $P_{cmax}$ denotes the maximum transmission power that the second UE 1205 is capable of using within a range less than or equal to pcmax, based on information configured for the second UE 1205 or the like. That is, this is to limit the power that the UE uses for transmission to Pcmax.

In the equation, $P_{SL}^{calculated}$ is a transmission power calculated in consideration of a pathloss when the second UE 1205 transmits a signal to the first UE 1201, and may be defined as, for example, $$P_{SL}^{calculated} = P_{O\_PSSCH} + 10 \log_{10}(2^\mu \cdot M_{RB}^{PSSCH}) + \alpha_{SL} \cdot PL_{SL}$$

or $$P_{SL}^{calculated} = P_{O\_PSSCH} + 10 \log_{10}(2^\mu \cdot M_{RB}^{PSSCH}) + \alpha_{SL} \cdot PL_{SL} + \Delta_{TF,SL} + f_{SL}.$$

$P_{Uu}^{calculated}$ is transmission power calculated in consideration of a pathloss when the second UE 1205 transmits a signal to the BS 1211, and may be defined as $$P_{Uu}^{calculated} = P_{O\_PSSCH} + 10 \log_{10}(2^\mu \cdot M_{RB}^{PSSCH}) + \alpha_{Uu} \cdot PL_{Uu}$$

or $$P_{Uu}^{calculated} = P_{O\_PSSCH} + 10 \log_{10}(2^\mu \cdot M_{RB}^{PSSCH}) + \alpha_{Uu} \cdot PL_{Uu} + \Delta_{TF,Uu} + f_{Uu}.$$

According to the equation, in the example of FIG. 14, the value 1215 is reported and, in this instance, it is a negative value. In this instance, in the embodiment, the reason of using the minimum value is to reduce interference affecting the BS, or to prevent a UE from performing transmission using power greater than Pcmax. There may be instances where the UE reports a PH having a negative value in operation 1680.

Third Embodiment

Figure 17:
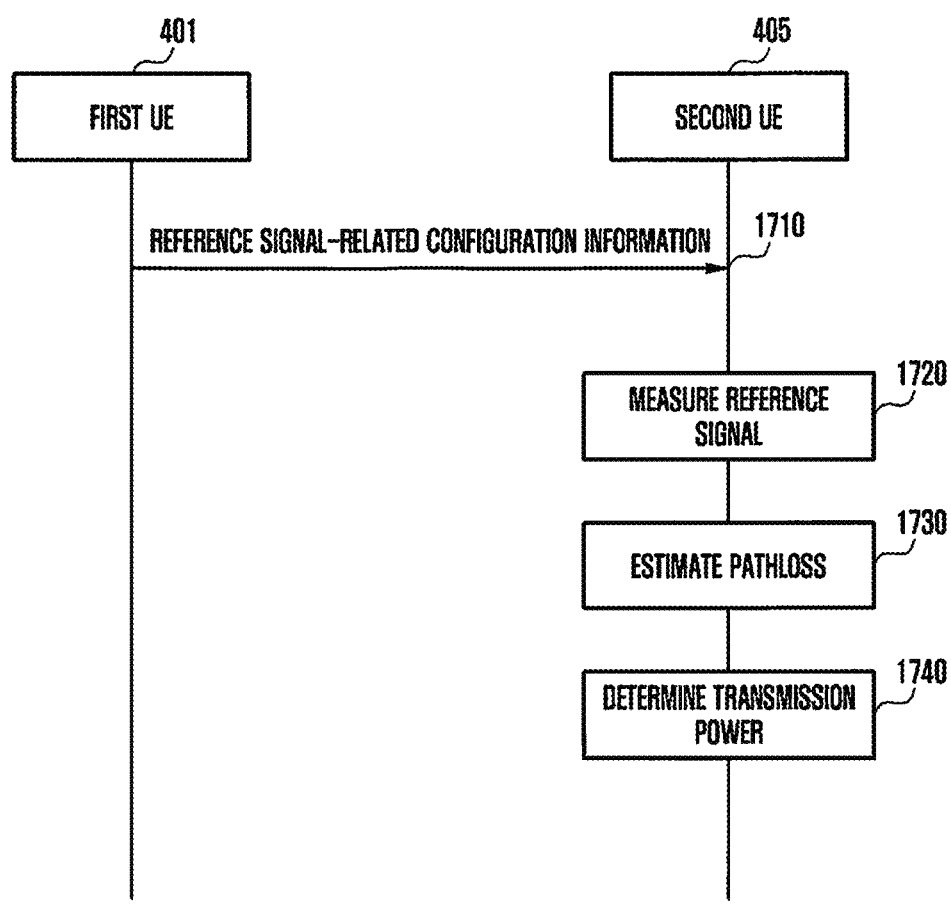
FIG. 17 is a diagram illustrating a method of reporting a power headroom of a UE for sidelink communication according to a third embodiment of the disclosure.

FIG. 17 is a diagram illustrating a method of reporting a power headroom of a UE for sidelink communication according to a third embodiment of the disclosure. First, in the case of unicast communication in a sidelink as shown in FIG. 4, a method of signal transmission or reception between the first UE 401 and the second UE 405, estimating a pathloss, and controlling power using the same will be described with reference to FIG. 17. In the disclosure, UEs are referred to as a transmission (Tx) UE (or a first UE) and a reception (Rx) UE (a second UE), but the operation performed by a UE is not limited by its name. For example, the first UE 401 corresponding to a Tx UE is capable of receiving a signal, in addition to transmitting a signal. In the same manner, the second UE 405 corresponding to an Rx UE is also capable of transmitting a signal, in addition to receiving a signal. Referring to FIG. 17, in operation 1710, the first UE 401 transmits configuration information related to a reference signal (e.g., information associated with a reference signal and power used for reference signal transmission) to the second UE 405.

In operation 1720, the second UE 405 may measure the reference signal transmitted from the first UE 401, and may calculate a reception power.

The second UE may estimate a pathloss between the first UE and the second UE in operation 1730. The second UE may estimate a pathloss between the first UE and the second UE based on information associated with the transmission power of the reference signal received in operation 1710 and the reception power measured in operation 1720.

For example, the pathloss may be the difference between the transmission power of the signal transmitted from the first UE 401 and the reception power measured by the second UE 405. This may be a reference signal received power (RSRP). The RSRP may be a linear average value of power transmitted in a resource element in which a predetermined reference signal is mapped and is transmitted, and may be expressed as a Watt. For example, an SSS, a CSI-RS, an SRS, or the like may be used as a reference signal for measuring an RSRP.

The second UE may determine a transmission power for newly transmitting feedback or a signal to the first UE in operation 1740. In this instance, the second UE may calculate the transmission power based on the pathloss calculated in operation 1730. For example, the transmission power may be calculated as shown in the following equation.

$$P_{PSSCH} = \min\{P_{cmax}, P_{O\_PSSCH} + 10 \log_{10}(2^\mu \cdot M_{RB}^{PSSCH}) + \alpha \cdot PL\}$$

In the equation, $P_{cmax}$ denotes the maximum transmission power that a UE is capable of using. $P_{O\_PSSCH}$ and $\alpha$ may be information shared between the first UE and the second UE via higher signaling.

The high signaling may be an RRC signaling for a sidelink such as PC5-RRC, may be a MAC CE, or may be information high-signaled from a BS. min{a,b} denotes the small value between a and b.

In the equation, PL may be the pathloss value measured in operation 1730. $\mu$ may be information associated with a numerology, and for example, may be information associated with a subcarrier spacing. For example, $\mu=0, 1, 2, 3$ may be values indicating 15 kHz, 30 kHz, 60 kHz, and 120 kHz, respectively. $M_{RB}^{PSSCH}$ denotes the size of a frequency resource to be used for sidelink data transmission, that is, a PSSCH. For example, $M_{RB}^{PSSCH}$ may be an RB unit.

The equation may be modified in various methods and may be applied. For example, the second UE 405 may receive, from the first UE 401, control information associated with power control, and may calculate a transmission power based on the received power control information and the following equation.

$$P_{PSSCH} = \min\{P_{cmax}, P_{O\_PSSCH} + 10 \log_{10}(2^\mu \cdot M_{RB}^{PSSCH}) + \alpha \cdot PL + \Delta_{TF} + f\}$$

$\Delta_{TF}$ and f may be values determined based on one, or a combination of two pieces of information, among control information transferred via a physical channel or higher signaling such as PC5-RRC between the first UE and the second UE. The second UE may report a power headroom to the first UE. In this instance, the power headroom may be based on information used for determining the transmission power, and the method of determining the power headroom is described later.

Figure 18:
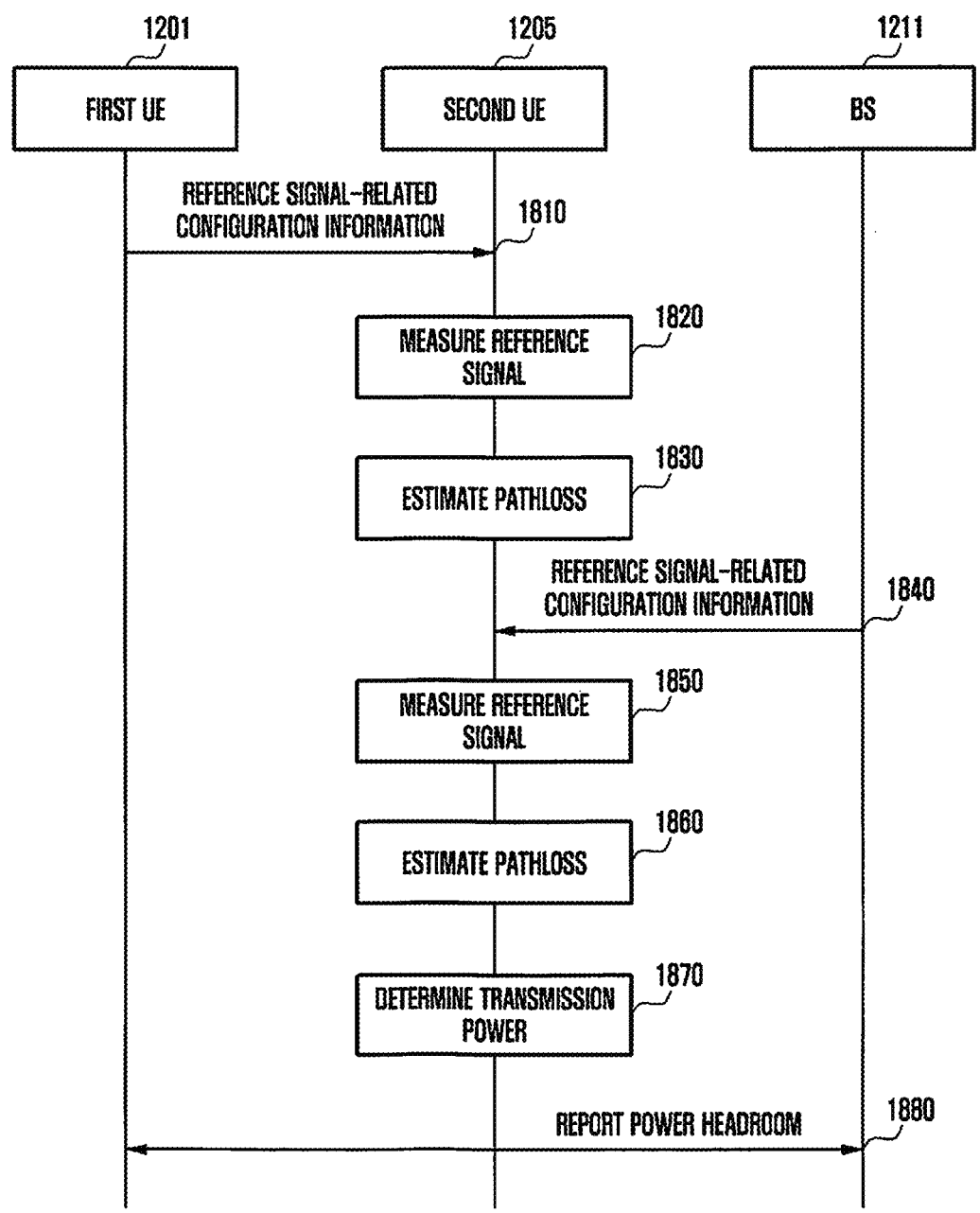
FIG. 18 is a diagram illustrating a method of reporting a power headroom of a UE for sidelink communication according to the third embodiment of the disclosure.

FIG. 18 is a diagram illustrating a method of reporting a power headroom of a UE for sidelink communication according to the third embodiment of the disclosure.

The second UE 1205 may measure the pathloss $PL_{SL}$ of the link 1203 with the first UE 1201 in operations 1810 to 1830, similar to operations 1710 to 1730.

In addition, the second UE 1205 may measure the pathloss $PL_{Uu}$ of the link 1213 from the BS 1211 in operations 1840 to 1860. A detailed description thereof will be described below.

Referring to FIG. 18, in operation 1810, the first UE 1201 transmits configuration information related to a reference signal (e.g., information associated with a reference signal and power used for reference signal transmission) to the second UE 1205.

In operation 1820, the second UE 1205 may measure the reference signal transmitted from the first UE 1201, and may calculate a reception power.

The second UE may estimate a pathloss between the first UE and the second UE in operation 1830. The second UE may estimate the pathloss $PL_{SL}$ of the link 1203 between the first UE 1201 and the second UE 1205 based on information associated with the transmission power of the reference signal received in operation 1810 and the reception power measured in operation 1820.

For example, the pathloss may be the difference between the transmission power of the signal transmitted from the first UE 1201 and the reception power measured by the second UE 1205. This may be an RSRP. The RSRP may be a linear average value of power transmitted in a resource element in which a predetermined reference signal is mapped and is transmitted, and may be expressed as a Watt. For example, an SSS, a CSI-RS, a sounding reference signal (SRS), or the like may be used as a reference signal for measuring an RSRP.

In operation 1840, the BS 1211 transmits configuration information related to a reference signal (e.g., information associated with a reference signal and power used for reference signal transmission) to the second UE 1205.

In operation 1850, the second UE may measure the reference signal transmitted from the BS 1211 and may calculate a reception power.

The second UE may estimate a pathloss between the BS and the second UE in operation 1860. The second UE may estimate the pathloss $PL_{Uu}$ of the link 1213 between the BS 1211 and the second UE 1205 based on information associated with the transmission power of the reference signal received in operation 1840 and the reception power measured in operation 1850.

For example, the pathloss may be the difference between the transmission power of the signal transmitted from the BS 1211 and the reception power measured by the second UE 1205. This may be an RSRP. The RSRP may be a linear average value of power transmitted in a resource element in which a predetermined reference signal is mapped and is transmitted, and may be expressed as a Watt. For example, an SSS, a CSI-RS, an SRS, or the like may be used as a reference signal for measuring an RSRP.

Operations S1810 to S1830 and operations S1840 to S1860 may be performed in a different order. That is, the process in which the second UE receives configuration information related to a reference signal from the BS and estimates a pathloss, and the process in which the second UE receives configuration information related to a reference signal from the first UE and estimates a pathloss may be performed in parallel, or in a different order.

The second UE may calculate power for sidelink data transmission of the second UE 1205 in operation 1870. In addition, in operation 1880, the second UE may report a power headroom of the second UE 1205 to the BS 1211 or the first UE 1201.

Particularly, the second UE may determine a transmission power for newly transmitting feedback or a signal to the first UE 1201 in operation 1870. In this instance, the second UE may calculate the transmission power based on the calculated pathloss $PL_{SL}$ of the link 1203 with the first UE and the pathloss $PL_{Uu}$ of the link 1213 with the BS. For example, the transmission power may be calculated as shown in the following equation.

$$P_{PSSCH} = \{P_{cmax}, P_{O\_PSSCH} + 10 \log_{10}(2^{\mu} \cdot M_{RB}^{PSSCH}) + \alpha_{SL} \cdot PL_{SL}, P_{O\_PSSCH} + 10 \log_{10}(2^{\mu} \cdot M_{RB}^{PSSCH}) + \alpha_{Uu} \cdot PL_{Uu}\}$$

In the equation, min (a,b,c) denotes the smallest value among a, b, and c. In the equation, $$P_{O\_PSSCH} + 10 \log_{10}(2^{\mu} \cdot M_{RB}^{PSSCH}) + \alpha_{SL} \cdot PL_{SL}$$

is a transmission power value calculated in consideration of the pathloss of a sidelink when the second UE 1205 transmits a signal and the signal is delivered to the first UE 1201 via the sidelink.

$$P_{O\_PSSCH} + 10 \log_{10}(2^{\mu} \cdot M_{RB}^{PSSCH}) + \alpha_{SL} \cdot PL_{SL}$$

is a value calculated in consideration of a reception power when the second UE 1205 transmits a signal and the signal is delivered to the BS 1211 via a link with the BS. In the equation, $\alpha_{SL}$ and $\alpha_{Uu}$ may be parameter values transferred to the second UE 1205 via higher signaling. In the equation, $$P_{O\_PSSCH} + 10 \log_{10}(2^{\mu} \cdot M_{RB}^{PSSCH}) + \alpha_{SL} \cdot PL_{SL}$$

may be modified to, for example, $$P_{O\_PSSCH} + 10 \log_{10}(2^{\mu} \cdot M_{RB}^{PSSCH}) + \alpha_{SL} \cdot PL_{SL} + \Delta_{TF,SL} + f_{SL},$$

and may be applied. Here, $\Delta_{TF,SL}$ and $f_{SL}$ may be values determined based on one, or a combination of two pieces of information, among control information transferred via a physical channel and higher signaling, such as PC5-RRC, between the first UE 1201 and the second UE 1205. Alternatively, $\Delta_{TF,SL}$ and $f_{SL}$ may be values determined based on one, or a combination of two pieces of information, among control information transferred via a physical channel and higher signaling, such as RRC, between the BS 1211 and the second UE 1205. In addition, in the equation, $$P_{O\_PSSCH} + 10 \log_{10}(2^{\mu} \cdot M_{RB}^{PSSCH}) + \alpha_{Uu} \cdot PL_{Uu}$$

may be modified to, for example, $$P_{O\_PSSCH} + 10 \log_{10}(2^{\mu} \cdot M_{RB}^{PSSCH}) + \alpha_{Uu} \cdot PL_{Uu} + \Delta_{TF,Uu} + f_{Uu},$$

and may be applied. Here, $\Delta_{TF,Uu}$ and $f_{Uu}$ may be values determined based on one, or a combination of two pieces of information, among downlink control information transferred via a physical channel and higher signaling, such as RRC, between the BS 1211 and the second UE 1205.

In operation 1880, the second UE may transfer a power headroom report (PHR) to the first UE 1201 or the BS based on calculating of power to be used for transmitting a sidelink physical channel or signal. That is, the second UE may determine the power headroom based on the information used for calculating the transmission power. The power headroom may be determined based on the equation below.

$$PH = P_{cmax} - P_{SL}^{calculated}$$

In the equation, $P_{cmax}$ denotes the maximum transmission power that the second UE 1205 is capable of using for sidelink transmission within a range less than or equal to Pcmax, based on information configured for the second UE 1205 or the like.

In the equation, $P_{SL}^{calculated}$ is a transmission power calculated in consideration of a pathloss when the second UE 1205 transmits a signal to the first UE 1201, and may be defined as, for example, $$P_{SL}^{calculated} = P_{O\_PSSCH} + 10 \log_{10}(2^{\mu} \cdot M_{RB}^{PSSCH}) + \alpha_{SL} \cdot PL_{SL}$$

or $$P_{SL}^{calculated} = P_{O\_PSSCH} + 10 \log_{10}(2^{\mu} \cdot M_{RB}^{PSSCH}) + \alpha_{SL} \cdot PL_{SL} + \Delta_{TF,SL} + f_{SL}.$$

According to the equation, in the example of FIG. 14, the value 1213 is reported and, in this instance, it is a positive value.

There may be instances where the UE reports a PH having a negative value in operation 1880.

Fourth Embodiment

Figure 19:
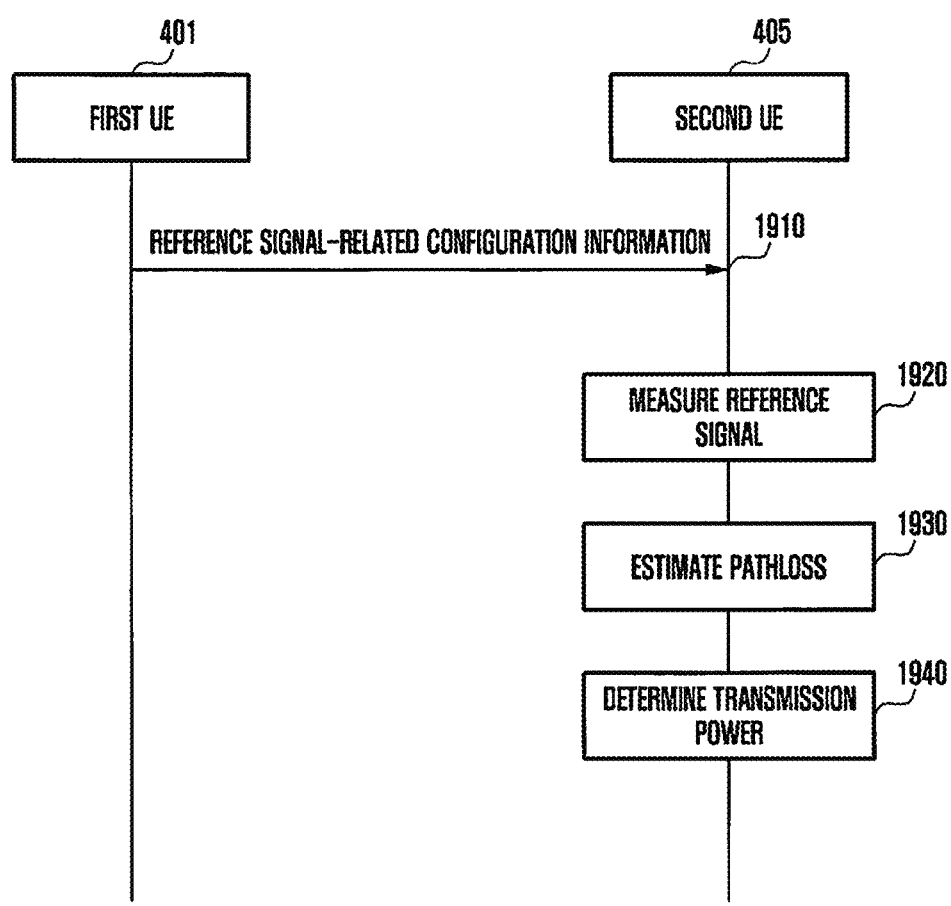
FIG. 19 is a diagram illustrating a method of reporting a power headroom of a UE for sidelink communication according to a fourth embodiment of the disclosure.

FIG. 19 is a diagram illustrating a method of reporting a power headroom of a UE for sidelink communication according to a fourth embodiment of the disclosure. First, in the case of unicast communication in a sidelink as shown in FIG. 4, a method of signal transmission or reception between the first UE 401 and the second UE 405, estimating a pathloss, and controlling power using the same will be described with reference to FIG. 19. In the disclosure, UEs are referred to as a transmission (Tx) UE (or a first UE) and a reception (Rx) UE (a second UE), but the operation performed by a UE is not limited by its name. For example, the first UE 401 corresponding to a Tx UE is capable of receiving a signal, in addition to transmitting a signal. In the same manner, the second UE 405 corresponding to an Rx UE is also capable of transmitting a signal, in addition to receiving a signal. Referring to FIG. 19, in operation 1910, the first UE 401 transmits configuration information related to a reference signal (e.g., information associated with a reference signal and power used for reference signal transmission) to the second UE 405.

In operation 1920, the second UE 405 may measure the reference signal transmitted from the first UE 401, and may calculate a reception power.

The second UE may estimate a pathloss between the first UE and the second UE in operation 1930. The second UE may estimate a pathloss between the first UE and the second UE based on information associated with the transmission power of the reference signal received in operation 1910 and the reception power measured in operation 1920.

For example, the pathloss may be the difference between the transmission power of the signal transmitted from the first UE 401 and the reception power measured by the second UE 405. This may be a reference signal received power (RSRP). The RSRP may be a linear average value of power transmitted in a resource element in which a predetermined reference signal is mapped and is transmitted, and may be expressed as a Watt. For example, an SSS, a CSI-RS, an SRS, or the like may be used as a reference signal for measuring an RSRP.

The second UE may determine a transmission power for newly transmitting feedback or a signal to the first UE in operation 1940. In this instance, the second UE may calculate the transmission power based on the pathloss calculated in operation 1930. For example, the transmission power may be calculated as shown in the following equation.

$$P_{PSSCH} = \min\{P_{cmax}, P_{O\_PSSCH} + 10 \log_{10}(2^\mu \cdot M_{RB}^{PSSCH}) + \alpha \cdot PL\}$$

In the equation, $P_{cmax}$ denotes the maximum transmission power that a UE is capable of using. $P_{O\_PSSCH}$ and $\alpha$ may be information shared between the first UE and the second UE via higher signaling.

The high signaling may be an RRC signaling for a sidelink such as PC5-RRC, may be a MAC CE, or may be information high-signaled from a BS. min{a,b} denotes the small value between a and b.

In the equation, PL may be the pathloss value measured in operation 1930. $\mu$ may be information associated with a numerology, and for example, may be information associated with a subcarrier spacing. For example, $\mu=0, 1, 2, 3$ may be values indicating 15 kHz, 30 kHz, 60 kHz, and 120 kHz, respectively. $M_{RB}^{PSSCH}$ denotes the size of a frequency resource to be used for sidelink data transmission, that is, a PSSCH. For example, $M_{RB}^{PSSCH}$ may be an RB unit.

The equation may be modified in various methods and may be applied. For example, the second UE 405 may receive, from the first UE 401, control information associated with power control, and may calculate a transmission power based on the received power control information and the following equation.

$$P_{PSSCH} = \min\{P_{cmax}, P_{O\_PSSCH} + 10 \log_{10}(2^\mu \cdot M_{RB}^{PSSCH}) + \alpha \cdot PL + \Delta_{TF} + f\}$$

In the equation, $\Delta_{TF}$ and f may be values determined based on one, or a combination of two pieces of information, among control information transferred via a physical channel or higher signaling such as PC5-RRC between the first UE and the second UE.

The second UE may report a power headroom to the first UE. In this instance, the power headroom may be based on the information used for determining the transmission power, and the method of determining the power headroom is described later.

Figure 20:
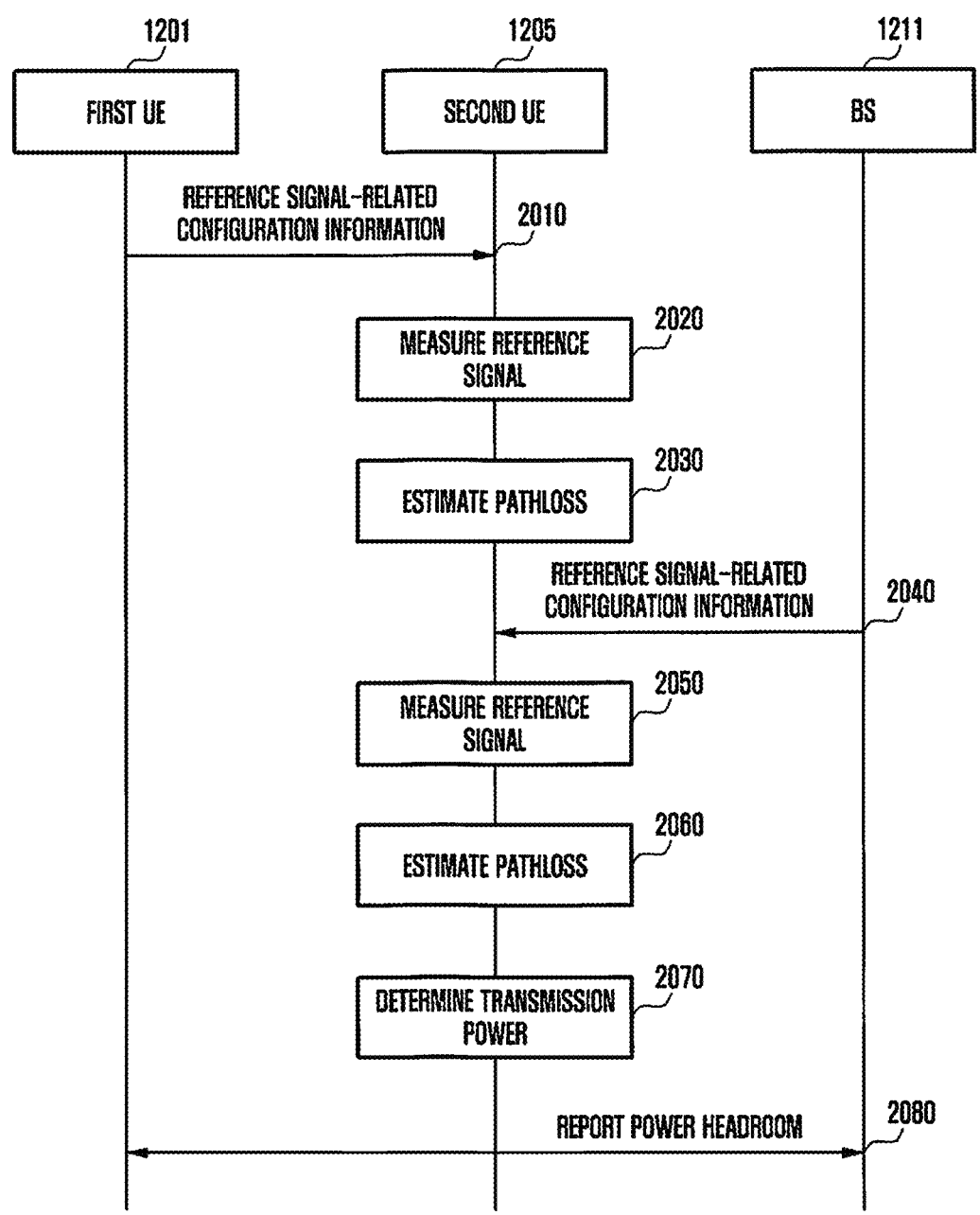
FIG. 20 is a diagram illustrating a method of reporting a power headroom of a UE for sidelink communication according to the fourth embodiment of the disclosure.

FIG. 20 is a diagram illustrating a method of reporting a power headroom of a UE for sidelink communication according to the fourth embodiment of the disclosure.

The second UE 1205 may measure the pathloss $PL_{SL}$ of the link 1203 with the first UE 1201 in operations 2010 to 2030, similar to operations 1910 to 1930. In addition, the second UE 1205 may measure the pathloss $PL_{Uu}$ of the link 1213 from the BS 1211 in operations 2040 to 2060. A detailed description thereof will be described below.

Referring to FIG. 20, in operation 2010, the first UE 1201 transmits configuration information related to a reference signal (e.g., information associated with a reference signal and power used for reference signal transmission) to the second UE 1205.

In operation 2020, the second UE 1205 may measure the reference signal transmitted from the first UE 1201, and may calculate a reception power.

The second UE may estimate a pathloss between the first UE and the second UE in operation 2030. The second UE may estimate a pathloss $PL_{SL}$ in the link 1203 between the first UE 1201 and the second UE 1205 based on information associated with the transmission power of the reference signal received in operation 2010 and the reception power measured in operation 2020.

For example, the pathloss may be the difference between the transmission power of the signal transmitted from the first UE 1201 and the reception power measured by the second UE 1205. This may be an RSRP. The RSRP may be a linear average value of power transmitted in a resource element in which a predetermined reference signal is mapped and is transmitted, and may be expressed as a Watt. For example, an SSS, a CSI-RS, a sounding reference signal (SRS), or the like may be used as a reference signal for measuring an RSRP.

In operation 2040, the BS 1211 transmits configuration information related to a reference signal (e.g., information associated with a reference signal and power used for reference signal transmission) to the second UE 1205.

In operation 2050, the second UE may measure the reference signal transmitted from the BS 1211 and may calculate a reception power.

The second UE may estimate a pathloss between the BS and the second UE in operation 2060. The second UE may estimate the pathloss U of the link 1213 between the BS 1211 and the second UE 1205 based on information associated with the transmission power of the reference signal received in operation 2040 and the reception power measured in operation 2050.

For example, the pathloss may be the difference between the transmission power of the signal transmitted from the BS 1211 and the reception power measured by the second UE 1205. This may be an RSRP. The RSRP may be a linear average value of power transmitted in a resource element in which a predetermined reference signal is mapped and is transmitted, and may be expressed as a Watt. For example, an SSS, a CSI-RS, an SRS, or the like may be used as a reference signal for measuring an RSRP.

Operations S2010 to S2030 and operations S2040 to S2060 may be performed in a different order. That is, the process in which the second UE receives configuration information related to a reference signal from the BS and estimates a pathloss, and the process in which the second UE receives configuration information related to a reference signal from the first UE and estimates a pathloss may be performed in parallel, or in a different order.

The second UE may calculate power for sidelink data transmission of the second UE 1205 in operation 2070. In addition, in operation 2080, the second UE 1205 may report the power headroom of the second UE 1205 to the BS 1211 or the first UE 1201.

Particularly, the second UE may determine the transmission power for newly transmitting feedback or a signal to the first UE 1201 in operation 2070. In this instance, the second UE may calculate the transmission power based on the calculated pathloss $PL_{SL}$ of the link 1203 with the first UE and the pathloss $PL_{Uu}$ of the link 1213 with the BS. For example, the transmission power may be calculated as shown in the following equation.

$$P_{PSSCH} = \min\{P_{cmax}, P_{O\_PSSCH} + 10 \log_{10}(2^\mu \cdot M_{RB}^{PSSCH}) + \alpha_{SL} \cdot PL_{SL}, P_{O\_PSSCH} + 10 \log_{10}(2^\mu \cdot M_{RB}^{PSSCH}) + \alpha_{Uu} \cdot PL_{Uu}\}$$

In the equation, min (a,b,c) denotes the smallest value among a, b, and c. In the equation, $$P_{O\_PSSCH} + 10 \log_{10}(2^\mu \cdot M_{RB}^{PSSCH}) + \alpha_{SL} \cdot PL_{SL}$$

is a transmission power value calculated in consideration of the pathloss of a sidelink when the second UE 1205 transmits a signal and the signal is delivered to the first UE 1201 via the sidelink.

$$P_{O\_PSSCH}+10\ \log_{10}(2^{\mu} \cdot M_{RB}^{PSSCH})+\alpha_{Uu} \cdot PL_{Uu}$$

is a value calculated in consideration of a reception power when the second UE 1205 transmits a signal and the signal is delivered to the BS 1211 via a link with the BS. In the equation, $\alpha_{SL}$ and $\alpha_{Uu}$ may be parameter values transferred to the second UE 1205 via higher signaling. In the equation, $$P_{O\_PSSCH}+10\ \log_{10}(2^{\mu} \cdot M_{RB}^{PSSCH})+\alpha_{SL} \cdot PL_{SL}$$

may be modified to, for example, $$P_{O\_PSSCH}+10\ \log_{10}(2^{\mu} \cdot M_{RB}^{PSSCH})+\alpha_{SL} \cdot PL_{SL}+\Delta_{TF,SL}+f_{SL},$$

and may be applied. Here, $\Delta_{TF,SL}$ and $f_{SL}$ may be values determined based on one, or a combination of two pieces of information, among control information transferred via a physical channel and higher signaling, such as PC5-RRC, between the first UE 1201 and the second UE 1205. Alternatively, $\Delta_{TF,SL}$ and $f_{SL}$ may be values determined based on one, or a combination of two pieces of information, among control information transferred via a physical channel and higher signaling, such as RRC, between the BS 1211 and the second UE 1205. In addition, in the equation, $$P_{O\_PSSCH}+10\ \log_{10}(2^{\mu} \cdot M_{RB}^{PSSCH})+\alpha_{Uu} \cdot PL_{Uu}$$

may be modified to, for example, $$P_{O\_PSSCH}+10\ \log_{10}(2^{\mu} \cdot M_{RB}^{PSSCH})+\alpha_{Uu} \cdot PL_{Uu}+\Delta_{TF,Uu}+f_{Uu},$$

and may be applied. Here, $\Delta_{TF,Uu}$ and $f_{Uu}$ may be values determined based on one, or a combination of two pieces of information, among downlink control information transferred via a physical channel and higher signaling, such as RRC, between the BS 1211 and the second UE 1205.

In operation 2080, the second UE may transfer a power headroom report (PHR) to the first UE 1201 or the BS based on calculating of power to be used for transmitting a sidelink physical channel or signal. That is, the second UE may determine the power headroom based on the information used for calculating the transmission power. The power headroom may be determined based on the equation below.

$$PH=P_{cmax}-P_{SL}^{calculated}-P_{Uu}^{calculated}$$

In the equation, $P_{cmax}$ denotes the maximum transmission power that the second UE 1205 is capable of using for sidelink transmission and Uu link transmission within a range less than or equal to Pcmax, based on information configured for the second UE 1205 or the like.

In the equation, $P_{SL}^{calculated}$ is a transmission power calculated in consideration of a pathloss or the like when the second UE 1205 transmits a signal to the first UE 1201, and may be defined as, for example, $$P_{SL}^{calculated}=P_{O\_PSSCH}+10\ \log_{10}(2^{\mu} \cdot M_{RB}^{PSSCH})+\alpha_{SL} \cdot PL_{SL}$$

or $$P_{SL}^{calculated}=P_{O\_PSSCH}+10\ \log_{10}(2^{\mu} \cdot M_{RB}^{PSSCH})+\alpha_{SL} \cdot PL_{SL}+\Delta_{TF,SL}+f_{SL}.$$

$P_{Uu}^{calculated}$ is a transmission power calculated in consideration of an approximate reception power when the second UE 1205 transmits a signal to the BS 1211, and may be defined as $$P_{Uu}^{calculated}=P_{O\_PSSCH}+10\ \log_{10}(2^{\mu} \cdot M_{RB}^{PSSCH})+\alpha_{Uu} \cdot PL_{Uu}$$

or $$P_{Uu}^{calculated}=P_{O\_PSSCH}+10\ \log_{10}(2^{\mu} \cdot M_{RB}^{PSSCH})+\alpha_{Uu} \cdot PL_{Uu}+\Delta_{TF,Uu}+f_{Uu}.$$

There may be instances where the UE reports a PH having a negative value in operation 2080.

Fifth Embodiment

In the fifth embodiment, a method of controlling a transmission power of a UE for sidelink communication and another method of reporting a power headroom by a second UE will be described.

The reporting method described in the first embodiment to the fourth embodiment may be applied differently by a UE depending on configuration in higher signaling.

For example, if configuration via higher signaling is not present, that is, before related configuration is received, embodiment 3 is applied. If configuration via higher signaling is present, embodiment 3 or embodiment 2 may be applied. That is, if related configuration is not present, $PH=P_{cmax}-P_{SL}^{calculated}$ is reported as a PHR. If configuration information is present, $$PH=P_{cmax}-P_{SL}^{calculated}$$

or $$PH=\min\{P_{cmax}-P_{SL}^{calculated}, P_{cmax}-P_{Uu}^{calculated}\}$$

may be applied. Various combinations of the first embodiment, the second embodiment, the third embodiment, and the fourth embodiment may be applied according to higher signaling.

In sum, a UE may receive, from a BS or a Tx UE, information associated with a method of reporting a power headroom via higher signaling. The UE may receive the information in advance. Alternatively, the information may be included in the above-described reference signal related information or the like, and may be transmitted to the UE.

Therefore, the UE may calculate and report a power headroom based on the information. A detailed description thereof is as described above.

However, if signaling associated with a method of calculating a power headroom as described above is not present, a predetermined method may be used. Alternatively, a method of calculating a power headroom may be determined based on a predetermined condition. For example, if the distance between the UE and the BS is close (i.e., if the strength (RSRP) of a reference signal measured by the UE is greater than a predetermined value), the UE may use the second embodiment. Subsequently, if information associated with the method of calculating a power headroom is received, the corresponding method may be used.

Figure 21:
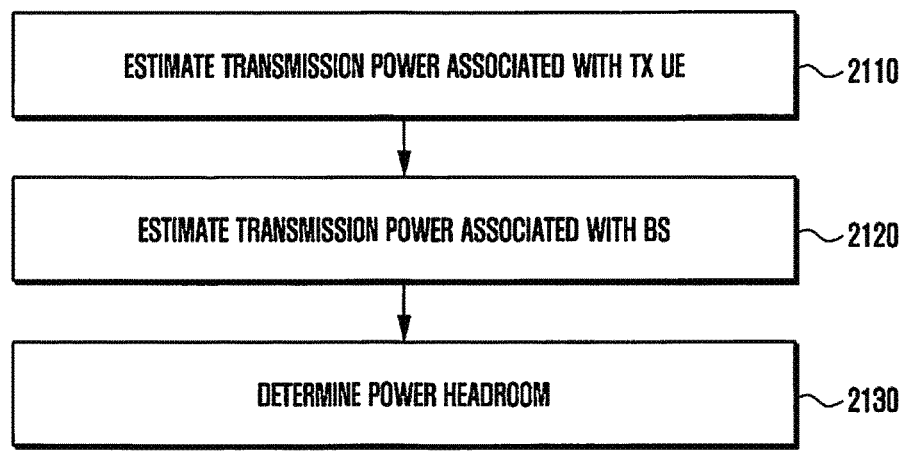
FIG. 21 is a diagram illustrating operation of a reception UE according to an embodiment of the disclosure.

FIG. 21 is a diagram illustrating operation of an Rx UE according to an embodiment of the disclosure.

Referring to FIG. 21, the Rx UE may estimate a first transmission power based on a pathloss associated with a Tx UE in operation S2110. The UE may receive configuration information associated with a reference signal from a first UE so as to estimate a pathloss, and may estimate the first transmission power. A detailed description thereof is as described above.

In operation S2120, the UE may estimate a second transmission power based on a pathloss associated with a BS. The UE may receive configuration information associated with a reference signal from the BS so as to estimate a pathloss, and may estimate the second transmission power. A detailed description thereof is as described above.

Subsequently, the Rx UE may determine a power headroom in operation S2130. The Rx UE may determine the power headroom based on the first transmission power and the second transmission power, and a detailed description thereof has been provided in the first embodiment to the fifth embodiment.

Figure 23:
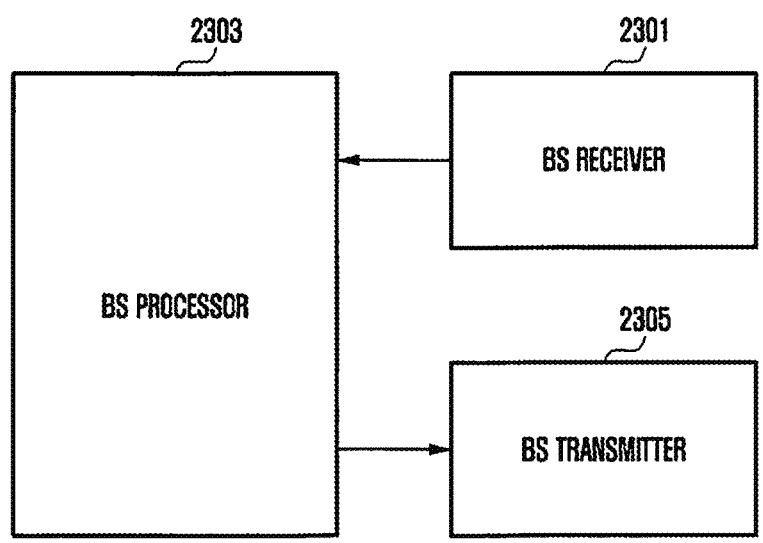
FIG. 23 is a diagram of the illustrating the internal structure of a BS according to embodiments of the disclosure.

FIG. 23 is a block diagram of the internal structure of a BS according to embodiments of the disclosure.

Figure 22:
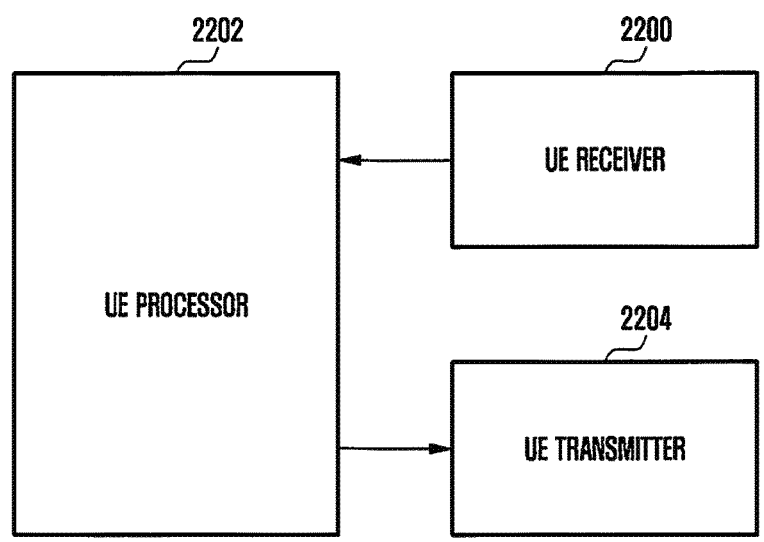
FIG. 22 is a diagram illustrating the internal structure of a UE according to embodiments of the disclosure.

To implement the above-described embodiments of the disclosure, a transmitter, a receiver, and a processor of each of a UE and a BS are illustrated in FIGS. 22 and 23. The first embodiment to the fifth embodiment describe a transmission or reception method performed between a BS and a UE in order to determine a transmission power and a power headroom, and to implement the same, each of the receivers, processors, and transmitters of the BS and the UE need to operate according to each embodiment. Although FIGS. 22 and 23 illustrate the structures of a BS and a UE for ease of description, those may be understood as structures of a first UE and a second UE in communication using a sidelink between UEs. Alternatively, those may be understood as the structure of a UE that acts as a leader and the structure of a UE that acts as a follower in unicast or groupcast.

Particularly, FIG. 22 is a block diagram of the internal structure of a UE according to an embodiment of the disclosure.

As illustrated in FIG. 22, the UE of the disclosure may include a UE receiver 2200, a UE transmitter 2204, and a UE processor 2202.

The UE receiver 200 and the UE transmitter 2204 are commonly called a transceiver in the embodiments of the disclosure. The transceiver may perform transmission or reception of a signal with a BS. The signal may include control information and data. To this end, the transceiver may include an RF transmitter that up-converts and amplifies a frequency of a transmitted signal, an RF receiver that low-noise amplifies a received signal and down-converts the frequency, and the like. In addition, the transceiver receives a signal via a wireless channel and outputs the same to the UE processor 2202, and transmits a signal, which is output from the UE processor 2202, via a wireless channel.

The UE processor 2202 may control a series of processes such that the UE operates according to the above-described embodiments of the disclosure. For example, the UE receiver 2200 receives control information for power control from a BS, the UE processor 1302 determines a transmission power and a power headroom report based on the control information and may prepare transmission based on the same. Subsequently, the UE transmitter 2204 transfers a signal to a Tx UE or a BS using the determined transmission power.

FIG. 23 is a block diagram of the internal structure of a BS according to an embodiment of the disclosure.

As illustrated in FIG. 23, the BS of the disclosure may include a BS receiver 2301, a BS transmitter 2305, and a BS processor 2303.

The BS receiver 2301 and the BS transmitter 2305 are commonly called a transceiver in the embodiments of the disclosure. The transceiver may perform transmission or reception of a signal with a UE. The signal may include control information and data. To this end, the transceiver may include an RF transmitter that up-converts and amplifies a frequency of a transmitted signal, an RF receiver that low-noise amplifies a received signal and down-converts the frequency, and the like. In addition, the transceiver receives a signal via a wireless channel and outputs the same to the BS processor 2303, and transmits a signal which is output from the UE processor 2303, via a wireless channel.

The BS processor 2303 may control a series of processes so that the BS operates according to the above-described embodiments of the disclosure. For example, the BS processor 2303 may perform control so as to produce control information that includes a command for controlling the transmission power of a UE or an Rx UE so that signal reception is appropriately performed. Subsequently, the BS transmitter 2305 transmits the control information including related power control, and the BS receiver 2301 receives data and a control signal transmitted from a UE. The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. Further, other variants of the above embodiments, based on the technical idea of the embodiments, may be implemented in LTE systems, 5G systems, and the like.

The invention claimed is:

1. A method of power control performed by a first user equipment (UE) in a communication system, the method comprising:
    identifying a downlink pathloss associated with a base station and a sidelink pathloss associated with a second UE;
    identifying a first transmission power based on the downlink pathloss, at least one first parameter configured for downlink pathloss based power control, and a first subcarrier spacing (SCS) configuration;
    identifying a second transmission power based on the sidelink pathloss, at least one second parameter configured for sidelink pathloss based power control, and a second SCS configuration;
    identifying a third transmission power based on a maximum transmission power of the first UE, the first transmission power, and the second transmission power; and
    transmitting a sidelink data based on the third transmission power,
    wherein a power headroom report, including a power headroom, associated with the sidelink transmission is transmitted from the first UE to the second UE, and
    wherein the power headroom is determined based on subtracting the first transmission power and the second transmission power from the maximum transmission power of the first UE.

2. The method of claim 1,
    wherein the third transmission power is identified as a minimum value among the maximum transmission power, the first transmission power, and the second transmission power.

3. The method of claim 1,
    wherein the downlink pathloss is identified based on a transmission power of a first reference signal transmitted from the base station and a reference signal received power (RSRP) of the first reference signal.

4. The method of claim 3,
wherein the RSRP of the first reference signal is an average power of resource elements that carry the first reference signal, and
wherein the first reference signal includes a secondary synchronization signal (SSS).

5. The method of claim 1,
wherein the sidelink pathloss is identified based on a transmission power of a second reference signal transmitted between the first UE and the second UE, and a reference signal received power (RSRP) of the second reference signal.

6. The method of claim 1,
wherein the at least one first parameter and the at least one second parameter are configured via a radio resource control (RRC) signaling.

7. A first user equipment (UE) in a communication system, comprising:
a transceiver; and
a controller configured to control to:
identify a downlink pathloss associated with a base station and a sidelink pathloss associated with a second UE,
identify a first transmission power based on the downlink pathloss, at least one first parameter configured for downlink pathloss based power control, and a first subcarrier spacing (SCS) configuration,
identify a second transmission power based on the sidelink pathloss, at least one second parameter configured for sidelink pathloss based power control, and a second SCS configuration,
identify a third transmission power based on a maximum transmission power of the first UE, the first transmission power, and the second transmission power, and
transmit, via the transceiver, a sidelink data based on the third transmission power,
wherein a power headroom report, including a power headroom, associated with the sidelink transmission is transmitted from the first UE to the second UE, and
wherein the power headroom is determined based on subtracting the first transmission power and the second transmission power from the maximum transmission power of the first UE.

8. The first UE of claim 7,
wherein the third transmission power is identified as a minimum value among the maximum transmission power, the first transmission power, and the second transmission power.

9. The first UE of claim 7,
wherein the downlink pathloss is identified based on a transmission power of a first reference signal transmitted from the base station and a reference signal received power (RSRP) of the first reference signal.

10. The first UE of claim 9,
wherein the RSRP of the first reference signal is an average power of resource elements that carry the first reference signal, and
wherein the first reference signal includes a secondary synchronization signal (SSS).

11. The first UE of claim 7,
wherein the sidelink pathloss is identified based on a transmission power of a second reference signal transmitted between the first UE and the second UE, and a reference signal received power (RSRP) of the second reference signal.

12. The first UE of claim 7,
wherein the at least one first parameter and the at least one second parameter are configured via a radio resource control (RRC) signaling.

* * * * *